United States Patent
Baranwal et al.

(10) Patent No.: US 11,777,411 B2
(45) Date of Patent: Oct. 3, 2023

(54) RESONANT POWER CONVERTER FOR WIDE VOLTAGE SWITCHING

(71) Applicant: Eaton Intelligent Power Limited, Dublin (IE)

(72) Inventors: Rohit Baranwal, Oak Park, MI (US); Devendra Patil, Oak Park, MI (US); Zhe Zhang, Ann Arbor, MI (US); Lewei Qian, Novi, MI (US); Miroslav Horejs, Miskovice (CZ); Guangqi Zhu, Pewaukee, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 59 days.

(21) Appl. No.: 17/632,020

(22) PCT Filed: Aug. 3, 2020

(86) PCT No.: PCT/EP2020/025355
§ 371 (c)(1),
(2) Date: Feb. 1, 2022

(87) PCT Pub. No.: WO2021/023398
PCT Pub. Date: Feb. 11, 2021

(65) Prior Publication Data
US 2022/0286055 A1 Sep. 8, 2022

Related U.S. Application Data

(60) Provisional application No. 62/944,808, filed on Dec. 6, 2019, provisional application No. 62/916,862, filed (Continued)

(51) Int. Cl.
*H02M 3/335* (2006.01)
*H02J 7/06* (2006.01)
*H02M 1/42* (2007.01)

(52) U.S. Cl.
CPC ........... *H02M 3/33569* (2013.01); *H02J 7/06* (2013.01); *H02M 1/4241* (2013.01)

(58) Field of Classification Search
CPC ............. H02M 3/335; H02M 3/33507; H02M 3/33553; H02M 3/33561; H02M 3/33569;
(Continued)

(56) References Cited

U.S. PATENT DOCUMENTS

| | | | |
|---|---|---|---|
| 4,352,080 | A | 9/1982 | Mitsui et al. |
| 4,417,194 | A | 11/1983 | Curtiss et al. |

(Continued)

FOREIGN PATENT DOCUMENTS

| | | |
|---|---|---|
| CN | 101308724 B | 4/2010 |
| CN | 102208242 B | 10/2013 |

(Continued)

OTHER PUBLICATIONS

International Search Report and Written Opinion for PCT/EP2020/025355, dated Nov. 9, 2020; pp. 1-14.
(Continued)

*Primary Examiner* — Yemane Mehari
(74) *Attorney, Agent, or Firm* — Talem IP Law, LLP

(57) ABSTRACT

A resonant converter device comprising a selectable primary winding comprising a plurality of circuit legs, the selectable primary winding comprising one or more of a tapped primary winding or a plurality of switchable primary windings. At least one secondary winding coupled to the selectable primary winding to form a resonant transformer. At least one resonant inductor coupled to at least one of the plurality of circuit legs. A plurality of resonant capacitors, each circuit leg comprising at least a respective one of the plurality of resonant capacitors, and at least a second resonant capacitor of the plurality of resonant capacitors coupled within the second circuit leg. And, one or more switching (Continued)

devices connected to the resonant transformer and configured to selectively vary a resonant impedance of the resonant converter device when a voltage inputted to the resonant converter device varies.

17 Claims, 55 Drawing Sheets

Related U.S. Application Data on Oct. 18, 2019, provisional application No. 62/882,035, filed on Aug. 2, 2019.

(58) Field of Classification Search
CPC .... H02M 1/10; H02M 1/4241; H02M 1/4258; H02J 7/06
USPC ......................................... 323/271, 282, 285
See application file for complete search history.

(56) References Cited

U.S. PATENT DOCUMENTS

| | | | |
|---|---|---|---|
| 4,424,504 A | 1/1984 | Mitsui et al. | |
| 5,408,171 A | 4/1995 | Eitzmann et al. | |
| 5,949,275 A | 9/1999 | Moller et al. | |
| 6,121,751 A | 9/2000 | Merritt | |
| 6,151,222 A | 11/2000 | Barrett | |
| 6,323,623 B1 | 11/2001 | Someya et al. | |
| 6,548,985 B1 | 4/2003 | Hayes et al. | |
| 7,151,364 B2 | 12/2006 | Kimura et al. | |
| 7,304,461 B2 | 12/2007 | Watanabe et al. | |
| 7,808,355 B2 | 10/2010 | Nagano et al. | |
| 7,839,255 B2 | 11/2010 | Nagano et al. | |
| 8,138,744 B2 | 3/2012 | Nagano et al. | |
| 8,502,520 B2* | 8/2013 | Chandrasekaran | H01F 27/38 336/212 |
| 9,160,179 B2 | 10/2015 | Someya | |
| 9,225,197 B2 | 12/2015 | Krauer | |
| 10,242,791 B2 | 3/2019 | Zhou et al. | |
| 2008/0297126 A1 | 12/2008 | Nagano et al. | |
| 2012/0112547 A1* | 5/2012 | Ghosh | H02J 9/062 307/66 |
| 2013/0250623 A1 | 9/2013 | Xu et al. | |
| 2014/0078801 A1 | 3/2014 | Timmons | |
| 2018/0375443 A1 | 12/2018 | Arulandu et al. | |
| 2019/0081572 A1* | 3/2019 | Hatano | H02M 1/10 |

FOREIGN PATENT DOCUMENTS

| | | |
|---|---|---|
| CN | 104282412 B | 1/2017 |
| CN | 209388828 U | 9/2019 |
| EP | 2600512 B1 | 9/2015 |
| EP | 2905789 B1 | 4/2021 |
| JP | 2009266978 A | 11/2009 |
| JP | 2009267718 A | 11/2009 |
| JP | 5081063 B2 | 11/2012 |
| JP | 2019500834 A | 1/2019 |

OTHER PUBLICATIONS

"Ferrite Cores" https://product.tdk.com/en/search/ferrite/ferrite/ferrite-core/catalog, downloaded Jan. 30, 2022, pp. 1-6.

"Mn—Zn Ferrite Cores for Switching Power Supplies: Planar Series" https://product.tdk.com/system/files/dam/doc/product/ferrite/ferrite/ferrite-core/catalog/ferrite_mz_sw_planar_en.pdf downloaded Jan. 30, 2022, pp. 1-49.

* cited by examiner

RESONANT POWER CONVERTER FOR WIDE VOLTAGE SWITCHING

This is a United States § 371 National Stage Application of PCT/EP2020/025355 filed Aug. 3, 2020 and claims the benefit of U.S. provisional 62/882,035 filed Aug. 2, 2019 and claims the benefit of U.S. provisional 62/916,862 filed Oct. 18, 2019 and claims the benefit of U.S. provisional 62/944,808 filed Dec. 6, 2019 all of which are incorporated herein by reference.

FIELD

This application provides a resonant DC converter device. The resonant DC converter device can comprise a resonant transformer. It can also comprise a switched capacitor bank. The resonant DC converter device is configured to convert a wide voltage range with high efficiency.

BACKGROUND

For applications such as an electric vehicle OBC (on-board charger), a voltage gain much higher than 1 can be required to meet the wide voltage range. But, designing a DC/DC converter for this wide range can require operation away from resonant frequency. This causes a reduction in the DC/DC converter's efficiency.

In non-resonant converters, efforts to handle large voltage ranges with a steady gain can result in a narrow range of duty ratio and fixed switching frequencies with some phase shifting.

SUMMARY

The methods and devices disclosed herein overcome the above disadvantages and improves the art by way of a resonant DC converter device configured to handle a wide voltage range with high efficiency. Several transformer combinations are illustrated and a switched capacitor bank can be included to reduce PFC DC link capacitor size while handling the wide voltage range.

A resonant converter device for varying resonant impedance can comprise a selectable primary winding, at least one secondary winding, at least one resonant inductor, a plurality of resonant capacitors, and at least one switching device. A selectable primary winding comprises a plurality of circuit legs, the selectable primary winding comprises one or more of a tapped primary winding or a plurality of switchable primary windings. The at least one secondary winding is coupled to the selectable primary winding to form a resonant transformer, the at least one secondary winding comprising at least a second circuit leg. The at least one resonant inductor is coupled to at least one of the plurality of circuit legs or is coupled to the second circuit leg. Each circuit leg of the plurality of circuit legs comprises at least a respective one of the plurality of resonant capacitors coupled within the each circuit leg, and at least a second resonant capacitor of the plurality of resonant capacitors is coupled within the second circuit leg. The one or more switching devices are connected to the resonant transformer and are configured to selectively vary a resonant impedance of the resonant converter device when a voltage inputted to the resonant converter device varies.

The selectable primary winding can comprise a first number of turns, wherein the at least one secondary winding can comprise a second number of turns, and wherein the first number of turns can differ from the second number of turns so as to induce a resonant inductance in the resonant transformer.

The at least one resonant inductor can be configured to receive variable inductances. When the one or more switching devices switch to connect to the resonant transformer, a predetermined magnetizing inductance to leakage inductance ratio can be maintained.

The plurality of resonant capacitors can be configured to receive one of a single phase current or a three phase current. And, the one or more switching devices can be configured to selectively connect to the resonant transformer to maintain a predetermined resonant frequency.

The selectable primary winding can comprise the plurality of switchable primary windings. The plurality of switchable primary windings can be configured with at least one of the one or more switching devices to connect serially or alternatively to form the resonant transformer.

The selectable primary winding can comprise the at least one tapped primary winding comprising a plurality of windings divided by at least a first tap. A first number of windings on a first side of the first tap can be not equal to a second number of windings on a second side of the first tap.

The at least one secondary winding can comprise a tapped secondary winding.

The at least one secondary winding can comprise a plurality of switchable secondary windings. And, the plurality of switchable secondary windings can be configured with at least one of the one or more switching devices to connect serially or alternatively to form the resonant transformer.

The one or more switching devices can be configured to selectively connect the selectable primary winding to operate the resonant transformer near a resonant frequency of the resonant converter device.

The switching devices can be connected to operate the resonant converter to switch among the plurality of resonant capacitors to maintain the resonant converter at or near unity gain when the voltage inputted to the resonant converter device varies.

The one or more switching devices can be configured to selectively switch among the plurality of circuit legs to vary the resonant impedance of the resonant converter device to maintain a predetermined resonant frequency when a voltage inputted to the resonant converter device varies.

The plurality of switching devices can comprise one or both of one or more relays and a plurality of metal-oxide-semiconductor field-effect transistors ("MOSFETs").

The resonant converter can further comprise a capacitor bank comprising at least one bank capacitor, one or both of a single phase input and a three phase input, and bank switches configured to couple the one or both single phase input and three phase input to the plurality of switching devices through the at least one bank capacitor.

A bank relay can be coupled to the at least one bank capacitor. The at least one bank capacitor can comprise a high side capacitor on a first side of the bank relay and a low side capacitor on a second side of the bank relay.

The resonant converter device can be configured as an on-board charger and can comprise a first battery circuit and a second battery circuit coupled to the resonant transformer. The first battery circuit can operate at a higher voltage than the second battery circuit.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures. Importantly, many embodiments show an on-board charger (OBC) configured with a power factor correction (PFC) on the left. For convenience, this is called the "primary" side of circuit for purposes of explaining the resonant transformer arrangement. Then, the right side of the circuit, comprising the batteries to be charged, is called the "secondary" side of the circuit. This arrangement helps to explain the charging of the batteries from the inputs in a consistent manner in the specification. However, it is possible, when the batteries are powering devices, that the right side becomes the "primary" side of the circuit, and the input side (left side) becomes an output side (secondary side). While not exhaustively described, it is possible to arrange many of the resonant transformer embodiments so that the switches, capacitors, and inductors illustrated on the primary side are instead included on the secondary side. So, the battery side can be configured to comprise selectable windings, a plurality of resonant capacitors, and one or more switching devices so that the battery side windings can be selectively switched to transfer varying voltages through the PFC side of the circuit.

Figure 1:
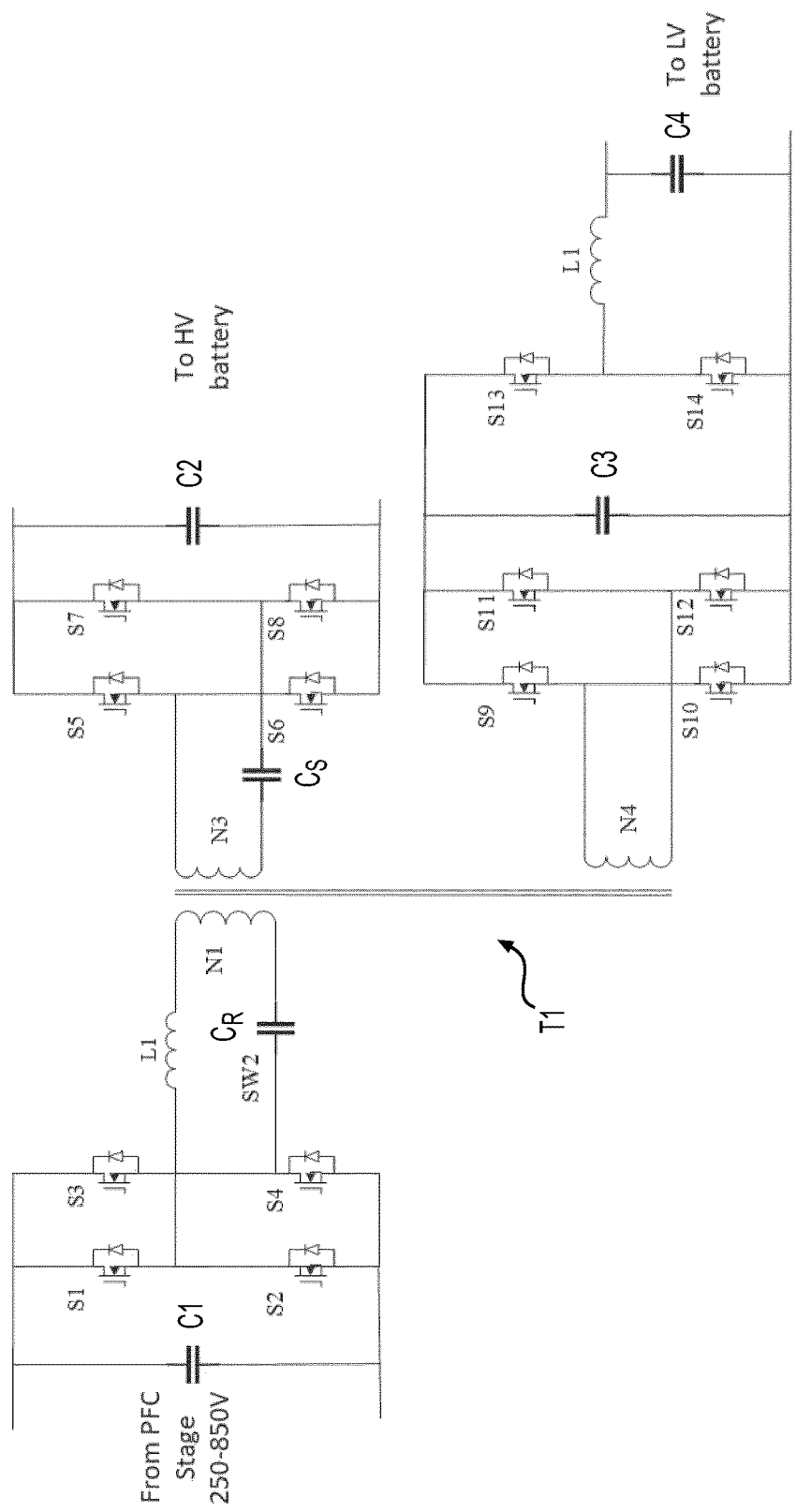
FIG. 1 is a diagram of an explanatory DC converter device.

In order to help understand the benefits of the resonant transformer arrangements and resonant converter devices, a comparative example is shown in FIG. 1. A wide range of input and output voltages can be transferred in an on-board charging (OBC) system. In FIG. 1, the input from a power factor correction (PFC) stage upstream in the circuit can comprise voltages from 250-850 Volts. The input can be supplied from, for example, regenerative braking, motors, turbines, among many other sources of charge. It is desired to charge batteries connected to the right side of FIG. 1. A high voltage (HV) battery and a low voltage (LV) battery can be connected to the terminals adjacent capacitors C2, C4. In this arrangement, the number of windings on the primary side of the circuit, at Node N1 is static. The secondary windings at nodes N3 & N4 are likewise static. One pair of inductor L1 and capacitor CR are shown in a switchable branch SW2 of the primary side. MOSFET switches S1-S14 are shown and can be controlled to switch to direct the voltage to or from the battery side. A capacitor CS and a capacitor C3 are shown on the secondary side. But, no selectable primary windings are shown in the transformer T1. And, no selectable secondary windings are shown in the Transformer T1. When the voltage from the PFC stage varies, the efficiency of the voltage transfer across the transformer T1 varies. The gain is not constant and the gain is not near unity for all voltages. So, the circuit of FIG. 1 is not very efficient as the current and voltage varies over the wide range of 250-850V.

In FIG. 1, the input to the high voltage DC/DC converter is either single phase from the power factor correction (PFC) or three phase from the PFC. In this scenario, if the input is single phase from the PFC, the output voltage range of the PFC is in a range of 250-450V. For the three phase from the PFC, the output voltage is in a range of 500-850V. In order to handle this wide range of PFC output voltages (250-850V) across the transformer T1, the switching frequency is varied in a wide range to regulate the output voltage. This leads to poor efficiency of the system due to higher switching losses and large circulating currents.

In the example circuit, the CLLC converter is designed for input voltage of 250-850V for an exemplary battery voltage of 225-450V. Therefore, the gain of the CLLC resonant converter is given as:

$$\text{Maximum gain} = \text{Max. battery voltage} \times \text{turns ratio}/\text{Min. PFC voltage} = 450 * \text{turns ratio}/250 \quad \text{Eq. 1}$$

$$\text{Minimum gain} = \text{Min. battery voltage} \times \text{turns ratio}/\text{Max. PFC voltage} = 225 * \text{turns ratio}/850 \quad \text{Eq. 2}$$

The ratio of Maximum to Minimum gain is 6.2. This wide range of gain can be achieved in FIG. 1 through a wide range of switching frequency variation. This will lead to an inefficient CLLC design. Higher switching and conduction losses in FIG. 1 will lead to lower efficiency. And, it will be difficult to design an EMI filter.

In order to transfer the voltages from the PFC side to the batteries with high efficiency and good gain, including at or near unity, a switchable resonant converter device is developed so that it is possible to vary the resonant impedance as operating conditions change and the circuit moves from high voltage to low voltage and from high current to low current. Several alternatives are shown. Full-bridge, half-bridge, and no-bridge variants are included. Tapped transformers and non-tapped transformers are shown. Numerous relay alternatives are also illustrated. Push & pull arrangements for bidirectional flow to and from the batteries are shown. And, one-directional flow from the PFC side to the battery can be accomplished, as when the powered devices, such as starter, motor, air conditioning, DVD player, radio, lighting, etc. is connected in series with the battery side. Many charging applications can benefit from the OBC system and resonant converter device shown and described, such as automobile, boat, truck, turbine structures, among others.

Turning to FIGS. 2-9, several variations can be studied. The position of the relay(s) vary for controlling connections to the tapped windings and switchable windings. The associated resonant inductance location on primary or secondary winding can thereby be varied. The push-pull (windings 3 & 4) or full-bridge nature (winding 3) of the low voltage (LV) battery side winding varies as illustrated. And the presence or absence of a secondary resonant inductance, as an extrinsic resonant inductor such as Lr2 or as an intrinsic aspect of the transformer windings, varies. That is, the gain control can be limited by the magnetic inductance, and so control of the leakage inductance can be had by the presence or absence of resonant inductors on the secondary winding side.

In the tapped transformer arrangements, it is possible to apply a tapped primary winding, a tapped secondary winding, or both. Then, a wide voltage range can be handled efficiently on the primary side and a wide voltage range can be handled efficiently on the secondary side.

Figure 2:
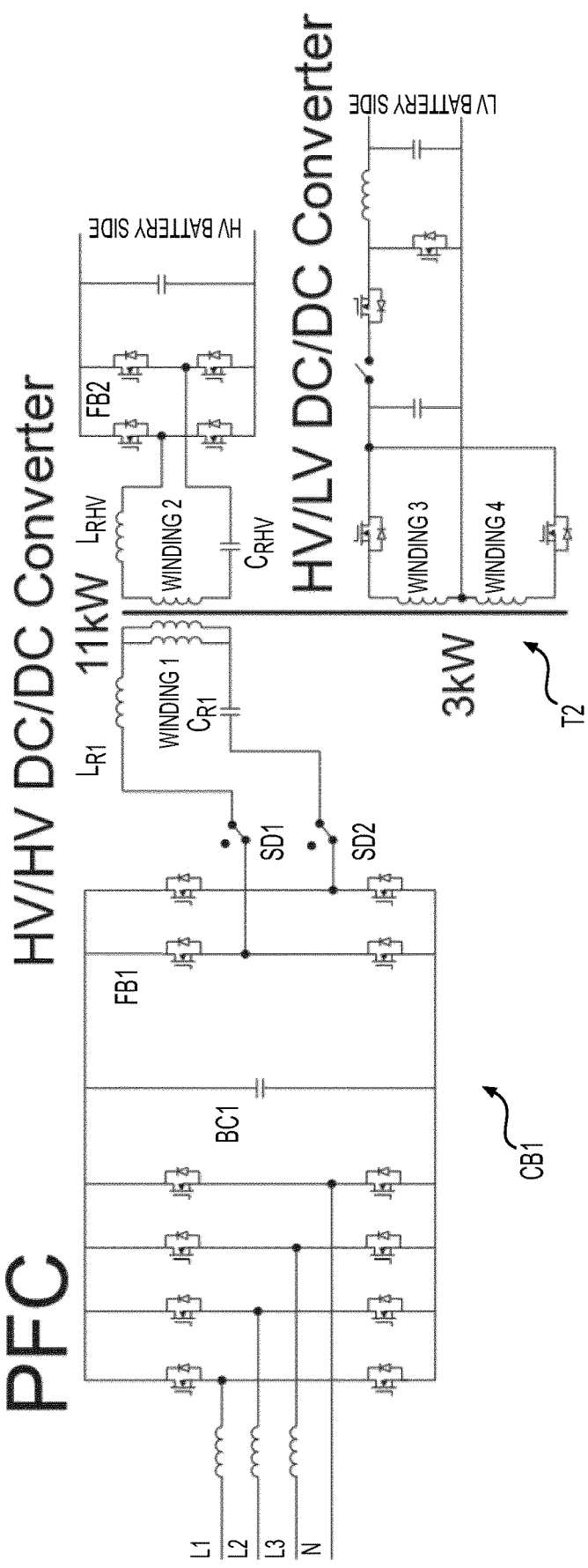
FIG. 2 is a first resonant DC converter device.

Turning to FIG. 2, a first multi-winding transformer T2 for DC/DC conversion of a very wide input and output voltage is shown. The topology improves OBC efficiency and is favorable for magnetic integration.

Resonant converter devices operate best at or close to resonant frequency. Wide operating voltage requirements can cause deviation from this point, reducing efficiency as in FIG. 1. A multi-winding transformer T2 is proposed to split the voltage range for solving this issue. Then, a steady gain, which can be at or near unity, or a very small gain range, can be obtained for efficient operation. A narrow range of operating switching frequencies can also be used, instead of a fixed switching frequency. Then, the resonant converter device can be combined with a capacitor bank. One or more bank capacitor BC1, BC2, BC3 in the capacitor bank CB1, CB2 can be manipulated, along with one or more resonant capacitor, to reduce the total capacitance required for the large voltage range. With the use of two relays, shown in some embodiments, it is possible to manipulate the bank and resonant capacitors in series or parallel, as the case may be. Then, a maximum voltage operating condition can be controlled via the relays to have a non-maximum operating current. And, a maximum operating current condition can be controlled via the one or more relay to have a non-maximum operating voltage. The capacitor bank, comprising one or more bank capacitor, can be manipulated to either block the maximum voltage (series connection) or flow maximum current (parallel connection), but not both at the same time.

LLC/CLLLC type resonant converter devices are very efficient when they are operated at their resonant frequency, or close to the resonant frequency. This however requires that the voltage gain (output to input voltage ratio) of the resonant converter device to be close to 1 (including the transformer turns ratio). For applications such as an electric vehicle OBC (on-board charger), a voltage gain much higher than 1 can be required to meet the wide voltage range. But, designing the resonant converter for this wide range requires operation away from resonant frequency. This causes a reduction in the converter's efficiency. So, it is desired to be at or near unity gain for the DC/DC conversion.

Figure 3:
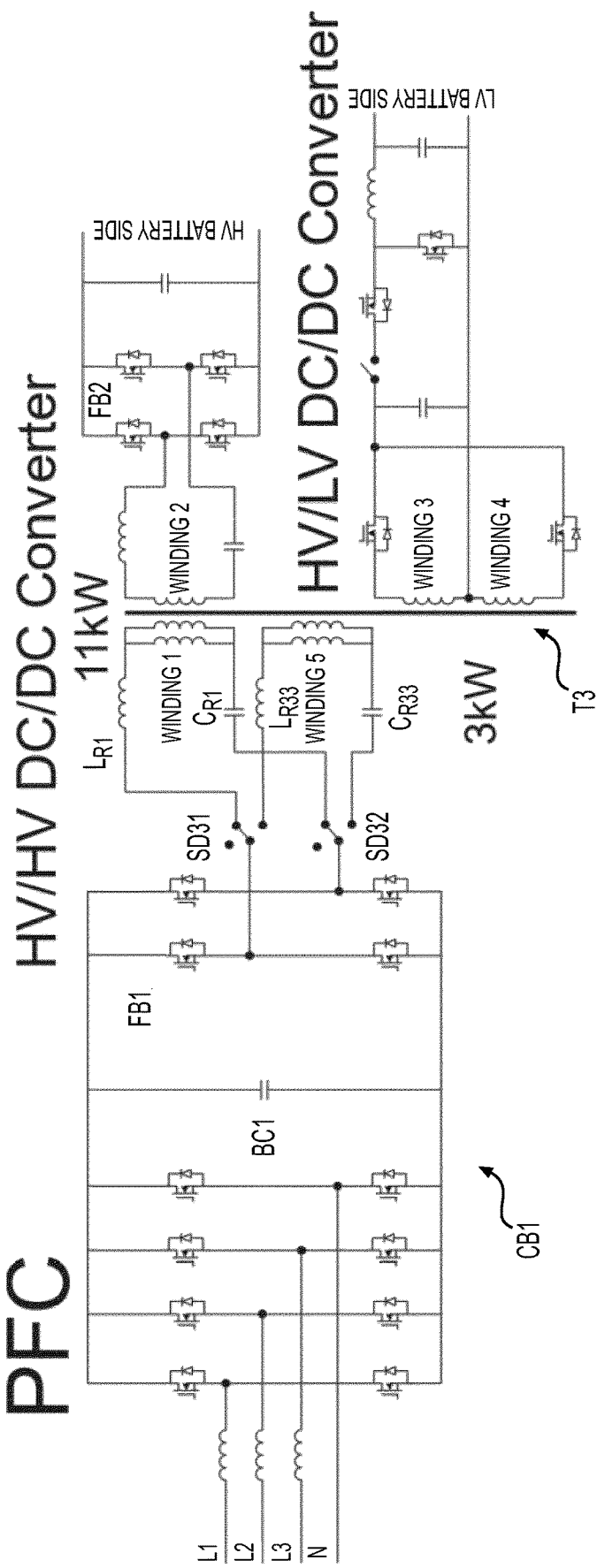
FIG. 3 is a second resonant DC converter device.

A first two transformer variants are used in a CLLLC/LLC resonant converter in FIGS. 2 & 3 for isolation and voltage step up/down. The step up/down ratio is equal to the turns ratio of the transformer T2, T3 and is fixed by design. The overall voltage gain from DC/DC converter input to output, is handled by changing the switching frequency of the converter. For a wide voltage gain, the switching frequency has to be varied in a wider range than in a non-resonant converter or phase-shifted converter.

It is proposed that the primary side of the transformer (or secondary side, this is notation only) has 2 windings at Winding 1 instead of 1 winding shown at node N1 in FIG. 1. The two windings could have a different number of turns, thus providing two ratios rather than a single step up/down ratio as occurs when using only one winding on the primary side. Each of the primary windings would also have a resonant inductor LR1 and resonant capacitor CR1 connected to it. Each of the two windings would be operated for different ranges of input/output voltages. Thus, the entire operating voltage range can be divided into two separate portions and the resonant converter can be designed for a smaller gain. This allows operation at or close to resonant frequency and thus, keeps the efficiency of the converter to the best possible values (other factors such as power devices, passive component characteristics being the same).

In FIG. 2, the full bridge FB1 capacitor bank CB1 is arranged with MOSFETs to act as switches. The lines L1, L2, L3, N can be configured for single phase or three phase operation. Voltage supplied by the lines are subject, via the MOSFET switching, to the bank capacitor BC1. Two switching devices SD1, SD2 are connected to vary the resonant impedance of the resonant converter device.

FIG. 2 shows a topology proposal for improving the OBC efficiency. A 4 winding resonant transformer T2 is shown, with all windings rated for 850V operating voltage and with current ratings are given below:

Winding 1: Rated to maximum current for 11 kW operation (happens at 240V single phase)
Winding 2: Rated to maximum current for 11 kW operation (max current at 225V battery voltage)
Winding 3 and 4: Rated to maximum current for 3 kW operation (happens at 9V LV battery voltage)

The current topology has a very wide voltage range at the PFC DC link, owing to requirements for both single phase and 3-phase grid connections. This leads to following problems:

The gain range of the CLLLC converter is very wide:

$$\text{Maximum gain} = \text{Max. battery voltage} \times \text{turns ratio} / \text{Min. PFC voltage} \qquad \text{eq. 1}$$

$$\text{Minimum gain} = \text{Min. battery voltage} \times \text{turns ratio} / \text{Max. PFC voltage} \qquad \text{eq. 2}$$

The ratio of maximum gain to minimum gain is given as:

$$\text{Max gain/Min. gain} = \text{Max. battery voltage} \times \text{Max. PFC voltage} / \text{Min. battery voltage} \times \text{Min. PFC voltage} \qquad \text{Eq. 3}$$

This is evaluated as: 450*850/225*250=6.2

The wide gain range of 6.2 could lead to an inefficient CLLLC design. The inefficient CLLLC design could require a wide switching frequency variation to cover the huge voltage range. The LV battery LLC converter is tied to the CLLLC design, so it can experience the same wide switching frequency variation, leading to it being less efficient as well. But, the resonant transformer arrangement can still be considered an efficiency improvement over the prior art, particularly when considering the reduction in the buck coupling, whereby a higher coupling efficiency can be gained with a reduced size coupled inductor.

Forming a HV/HV DC/DC converter (high voltage to high voltage direct current to direct current converter), Winding 1 in FIG. 2 can comprise two primary windings, also called parallel primary windings. Winding 2 can be selected for the voltage transfer across to the high voltage (HV) battery side. An additional resonant capacitor CRHV and resonant inductor LRHV can be included on the HV battery side, with a second full bridge FB2 MOSFET arrangement and capacitor. If there is a winding mismatch between the windings of Winding 1 and the windings of Winding 2, resonant inductor LRHV can be omitted because the resonant transformer T2 will have an intrinsic inductance. Or, the resonant inductor LRHV or a standard inductor can alternatively be used to balance or manipulate the intrinsic inductance for favorable charging of the HV battery.

Forming a HV/LV DC/DC converter (high voltage to low voltage direct current to direct current converter), Windings 3 & 4 are configured as a tapped winding with switching MOSFETs and a buck for coupling to the low voltage (LV) battery side. As with other disclosed tapped windings, a tap can be centered or can be askew so that a first number of turns can be on the winding 3 side of the tap and a second number of turns can be on the winding 4 side of the tap. The number of windings on each side of the tap can be the same or the number of turns can be non-equal.

If the total number of windings in the resonant transformer T2 are similar enough, then it is possible to have a single resonant circuit, such as the primary side LLC resonant circuit with resonant inductor LR1 and resonant capacitor CR1 in FIG. 2. The relay formed by switching devices SD1, SD2 combined with the capacitor bank CB1 functionality enables sufficient gain adjustment at the resonant transformer T2 to handle a large voltage variation.

Figure 9:
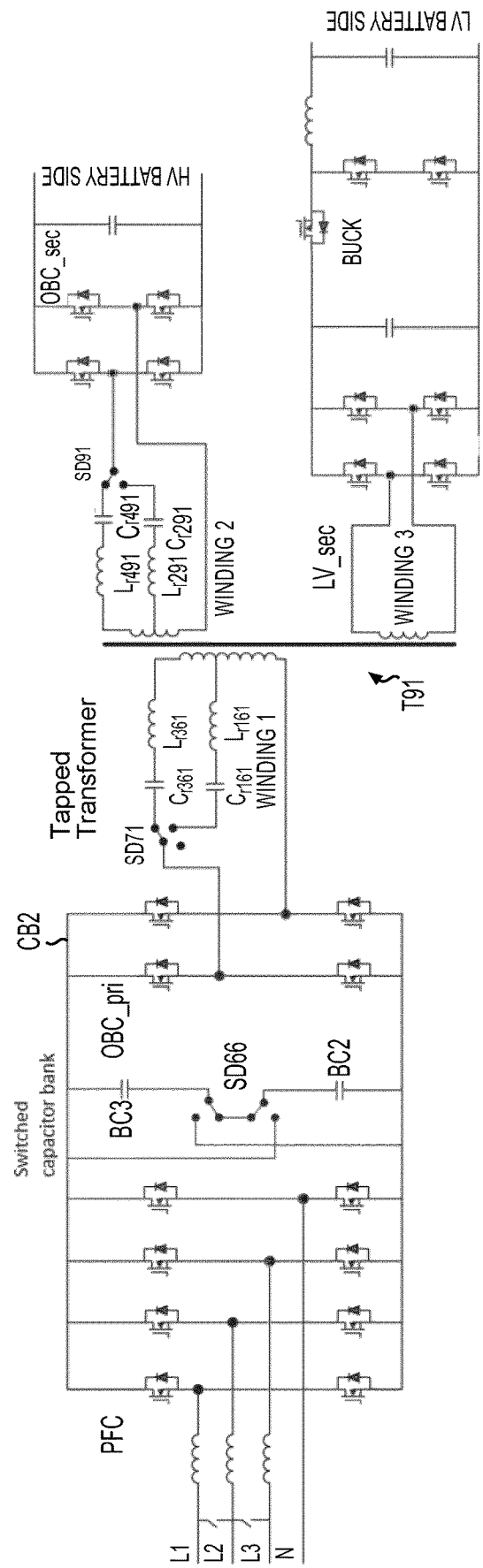
FIG. 9 shows an additional resonant DC/DC converter device.

But sometimes there is need for multiple CLLLC or LLC resonant circuits, as for example, in the FIG. 9 series. In the FIG. 9 series, the taps are positioned far apart in Windings 1 & 2 so that the number of windings can vary to such an extent as to benefit from a second CLLC resonant circuit on the secondary side. In the FIG. 9 example, the second resonant circuit appears at the HV battery side.

A third configuration for accomplishing the gain adjustment at the resonant transformer for the wide voltage variation can be seen in FIG. 3. This resonant converter device has similar components as FIG. 2 and can also satisfy an 11 kW transfer to Winding 2 to charge the HV battery side with switching to satisfy 3 kW transfer to Windings 3 & 4 at the LV battery side. But, this configuration comprises a plurality of switchable primary windings (Windings 1 & 5) as the selectable primary winding. An LLC resonant circuit is included for each switchable primary winding. So, Winding 1 comprises resonant inductor LR1 and resonant capacitor CR1 while Winding 5 comprises resonant inductor LR33 and resonant capacitor CR33. Yet another LLC resonant circuit can be formed on the secondary side in Winding 2 for efficient power transfer to HV battery side.

FIG. 3 comprises a 5-winding resonant transformer with switching devices SD31, SD 32 configured to vary the resonant impedance with the voltage varies. With the switching devices, it is possible to arrange the primary side with more windings than those windings on the secondary side. The windings can comprise different numbers of turns to provide multiple turn ratios between the primary and secondary sides of the resonant transformer T3. Then, by controlling the switching devices, it is possible to control how many primary windings are actively transferring power and what resonant impedance the transferred voltage receives. Each LLC resonant circuit can be tailored for a subset of the voltage range supplied by the PFC. Then the gain can be kept at or near unity or at least within a steady, narrow range. Likewise, as in FIG. 2, the secondary side windings 2, 3, 4 can comprise more windings on the secondary side than on the primary side Winding 1. Now, the secondary side windings can comprise different numbers of turns to provide multiple ratios. The FIG. 9 series takes these FIGS. 2 & 3 concepts and extends them for a combined capacity to offer multiple ratios via the primary side and multiple ratios via the secondary side. Via the various winding turns ratios, the efficiency is improved. So, it is possible to have a plurality of switchable primary windings and a plurality of switchable secondary windings to make up a resonant transformer. The number of windings can vary among the plurality of primary and secondary windings to enable a selectable variation in the turns ratios. Likewise, a plurality of tapped primary and tapped secondary windings can comprise a respective number of windings positioned with respect to the respective taps so that the number of windings that can be selected can be varied by way of selection with the switching devices herein. The tapped winding and plurality of switchable windings are not exclusive and can be combined as disclosed in various of the Figures. By varying the turns ratio, and by varying the combinations of resonant capacitors and resonant inductors, it is possible to accomplish one or more of the following goals: efficient voltage transfer across an OBC; wide voltage range transfer across an OBC; maintaining a predetermined resonant frequency in a resonant converter while the voltage varies over a wide range; maintaining a predetermined magnetizing inductance to leakage inductance ratio; and operating a resonant converter at or near unity gain.

Returning to FIG. 3, the proposed topology comprises a solved-for problem where the PFC voltage range is 250-450V for single phase AC voltage and around 650-850V for 3-phase voltage. They could be handled, as in FIG. 2, by one set of transformer windings (Windings 1 and 2). However, we add a 5th winding to handle the 3 phase AC connection scenario and configure Winding 1 for handling the high current single-phase scenario.

Winding 5 is given characteristics whereby it comprises a lower current winding than Winding 1. This is done because, during the 3-phase connection, lower current would flow for 11 kW than for a single phase AC connection. Winding 5 has the same number of turns as Winding 1 has in FIG. 2, because Winding 5 has to handle the higher PFC voltage during operation (650-850V).

In FIG. 3, Winding 1 changes. Winding 1 now has nearly half the number of turns as the Winding 5, because it has to handle a lower PFC voltage range corresponding to single phase AC (the insulation voltage rating is still 850V).

The FIG. 3 topology allows for the CLLLC to be flexible enough in design that is can be designed for a much narrower gain range. Also, the LV battery LLC converter would operate more efficiently owing to a better design of the CLLLC resonant circuit.

FIGS. 4A-4D will now be explained. FIGS. 4A-4D show variants with additional resonant converter aspects. Proposed methods and proposed variants with additional resonant features in each tap and variants with additional resonant features in one tap are shown. The multi-tap resonant transformers T41-T44 also solve the problem of wide input and output voltage ranges. A CLLC resonant converter can operate near resonant frequency throughout the wide ranges with high efficiency. A capacitor C1 is coupled with MOSFET switching devices S1-S4 at the PFC side of the circuit. Likewise, as a working example, a MOSFET arrangement of switching devices S5-S8 and capacitors CS & C2 are connected at the HV battery side (capacitor CS can optionally be a resonant capacitor). The LV battery side has a buck option with buck inductor LB and capacitor C4, which are coupled to MOSFET switching devices S9-S14 in an arrangement with capacitor C3. Additional safety switches, including MOSFET safety switches can be included. Optionally, the inductor is a coupled inductor such as PQ, I or E core.

FIG. 4A-4D show alternatives for a multi-tapped resonant transformer T41-T44 with multiple windings tapped on the primary side instead of one or a plurality of single or dual winding transformers. The tapped transformer has tapped primary windings at nodes N1, N2 with a number of turns NT2 and number of turns NT1 at the primary side. The total turns on primary side is NT1+NT2. On the secondary side, node N3 comprises a number of turns NT3 and node N4 comprises a number of turns NT4.

In a first mode, when switching device SD41 is connected to position 1, the turns ratio of the resonant transformer T41 from secondary windings to primary windings is NT3/(NT1+NT2). This position is more suitable when the input is three phase PFC for output voltage of 500-850V.

Figure 4A:
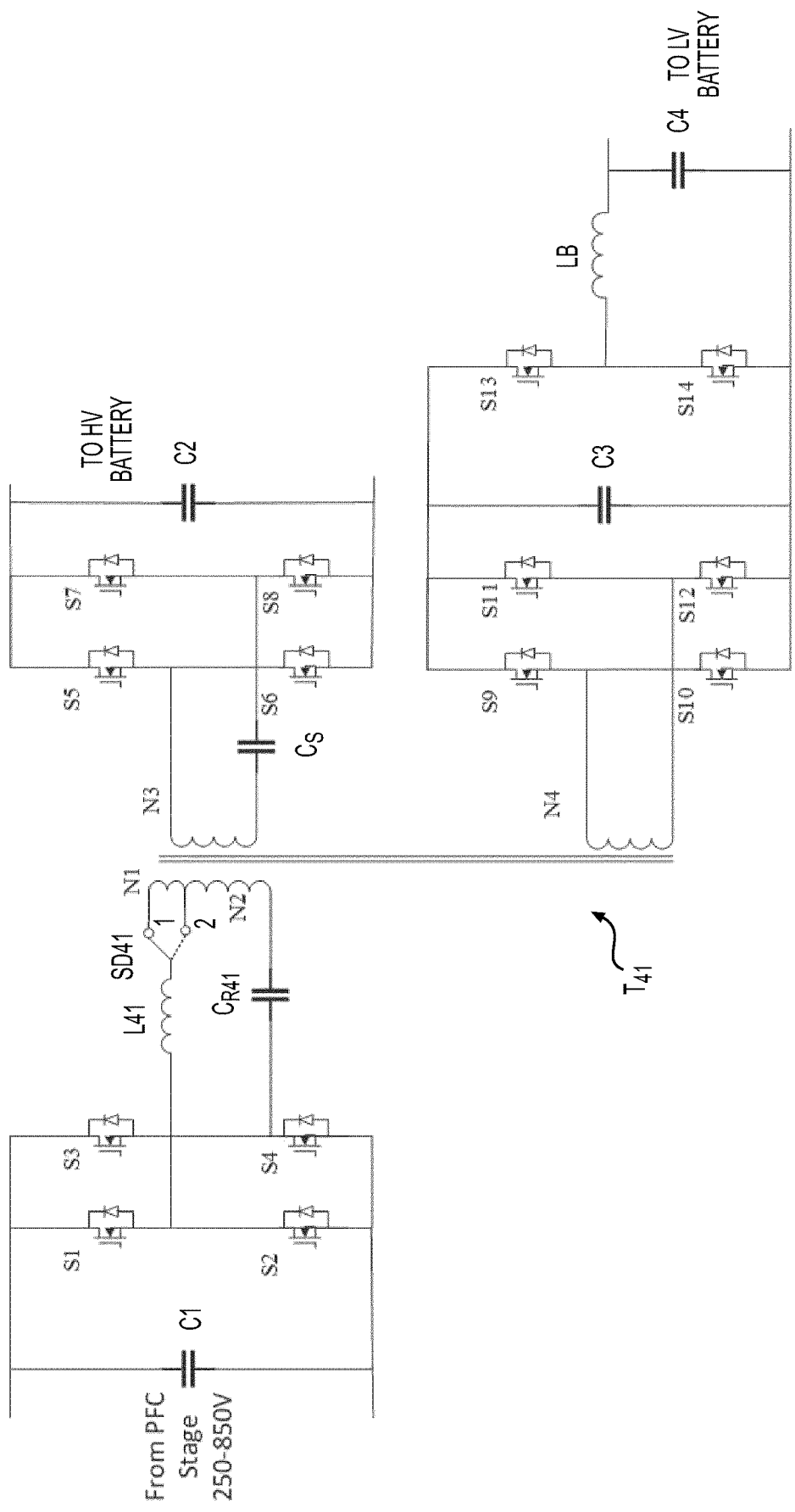
FIGS. 4A-4D illustrate additional aspects of a resonant DC/DC converter device.

In a second mode, when switching device SD41 is connected to position 2, the turns ratio of the resonant transformer T41 from secondary windings to primary windings is NT3/NT2. In this position, voltage gain from the resonant transformer T41 is less than that of the first mode. This second mode is suitable for single phase from the PFC when the single phase PFC output voltage is in the range of 250-450V. In FIG. 4A, the inductor L41 can be extrinsically resonant or inductive resonance can be intrinsic to the transformer T41. The resonant capacitor CR41 is shared by control of switching device SD41.

Figure 4B:
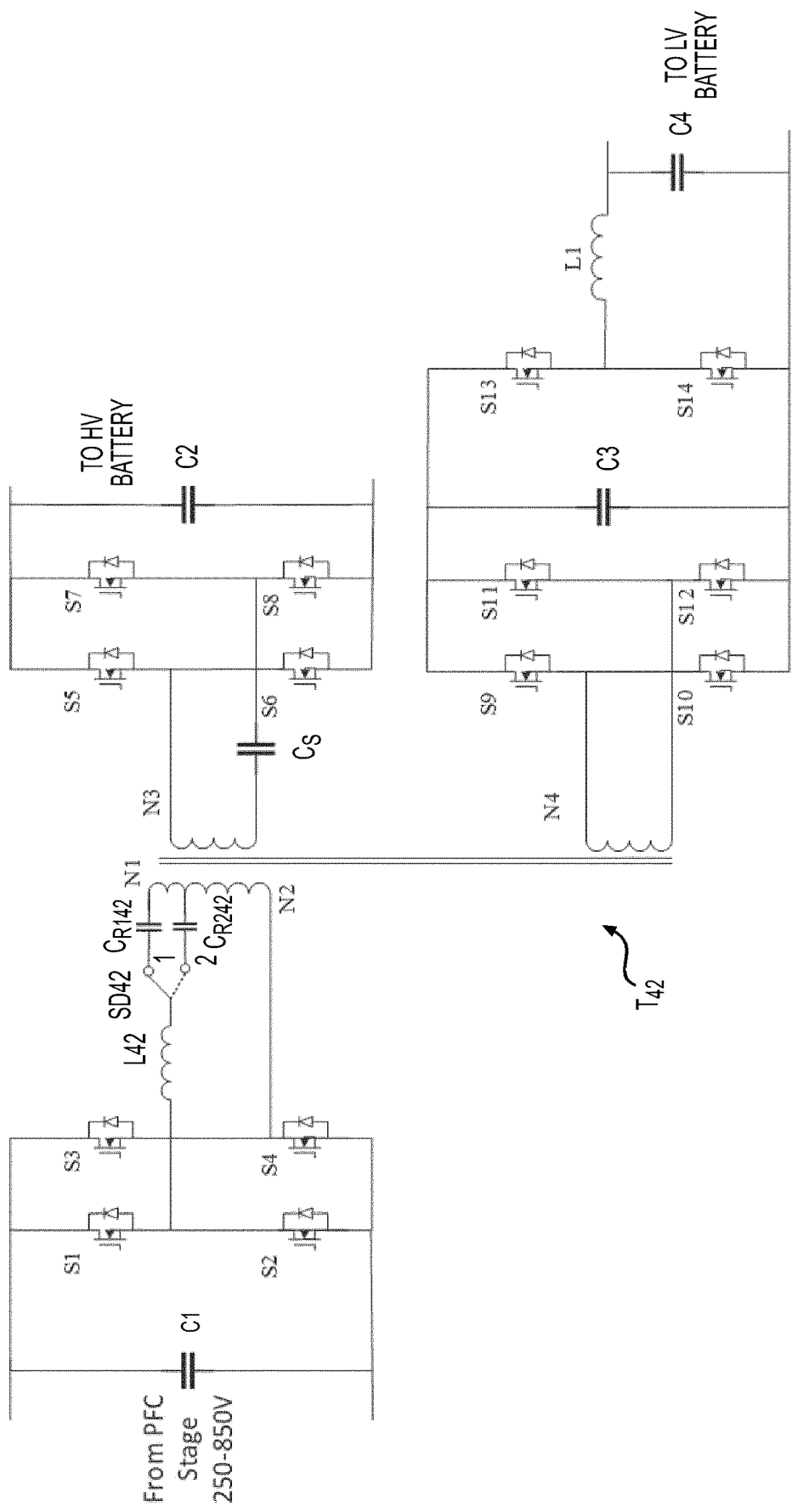

In FIG. 4A, it is possible for the resonant frequency to be different for single phase and three phase operations due to variations in magnetizing inductance caused by the shared resonant capacitor CR41. To solve this issue, for single phase and three phase cases, independently selectable resonant capacitors CR142, CR242 are added to adjust the resonant impedance when connected to Node N1 or Node N2, as shown in FIG. 4B. The inductor L42, which can be resonant or not, is coupled to switching device SD42 so that it impacts the resonant transformer in both switching positions 1, 2 of switching device SD42. The value of resonant capacitors CR141, CR242 are adjusted to keep the resonant frequency the same irrespective of whether switching device SD42 selects between the single phase (second mode) and three phase (first mode) input condition.

Figure 4C:
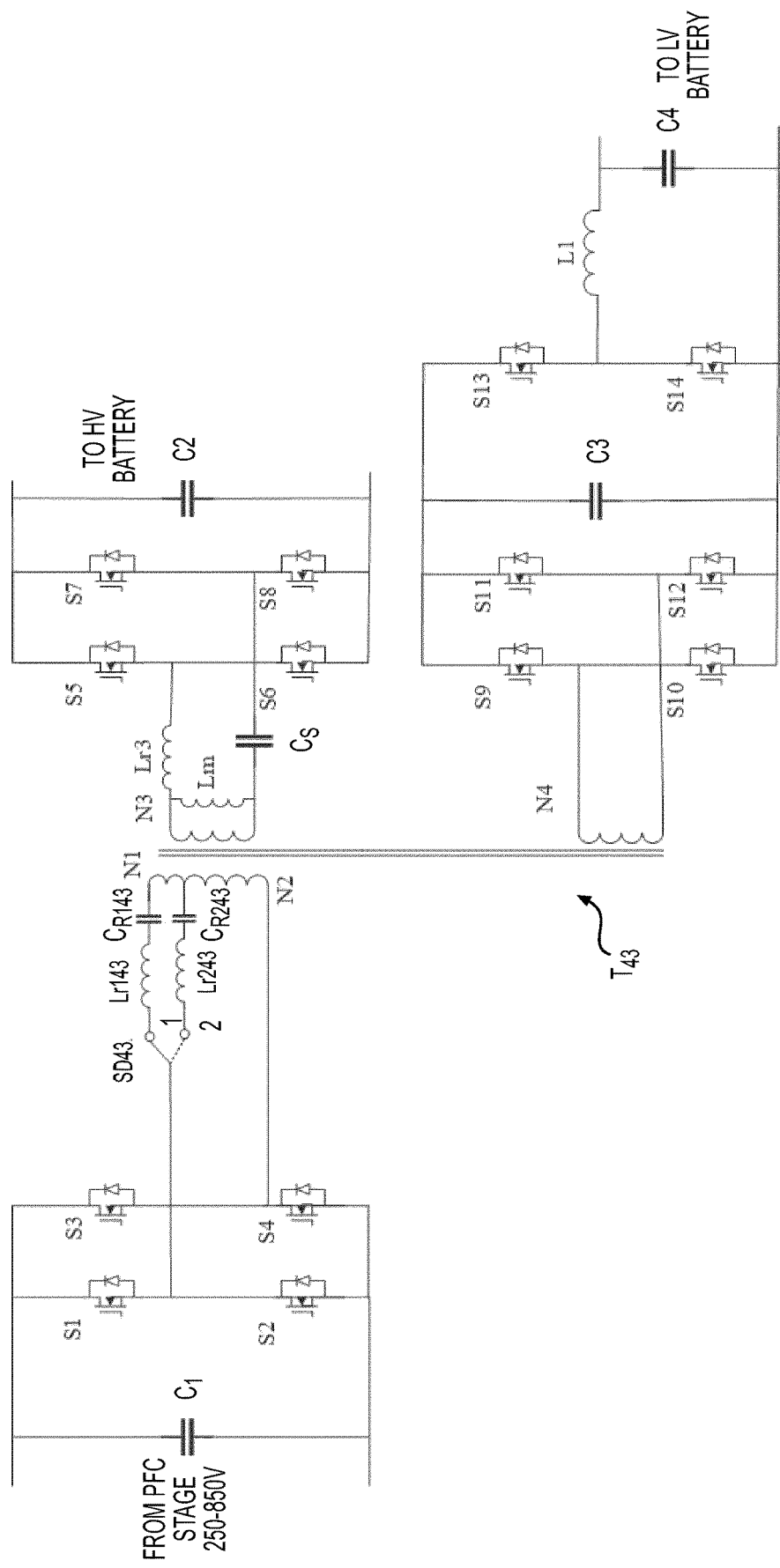

Now, another variable to solve for in FIG. 4B is its ratio of magnetizing inductance to leakage inductance, which will change. When the tap of the primary winding is changed by switching device SD42 between position 1 & 2, this causes the resonant converter device to have a variation in plot (slope of gain) but with a same series resonant frequency. In order to avoid a change in the plot of voltage gain with the resonant frequency, FIG. 4C is proposed. In the solution of FIG. 4C, a separate resonant inductor Lr143, Lr243 is provided in the circuit legs for each tapped primary winding along with the resonant capacitors CR143, CR243. Now each node N1, N2 comprises a selectable resonant circuit to couple to the resonant transformer T43. This will keep the same series resonant frequency for each node N1, N2 and also the magnetizing inductance to leakage inductance ratio is kept constant when the switching device SD43 moves between position 1 & 2.

Figure 4D:
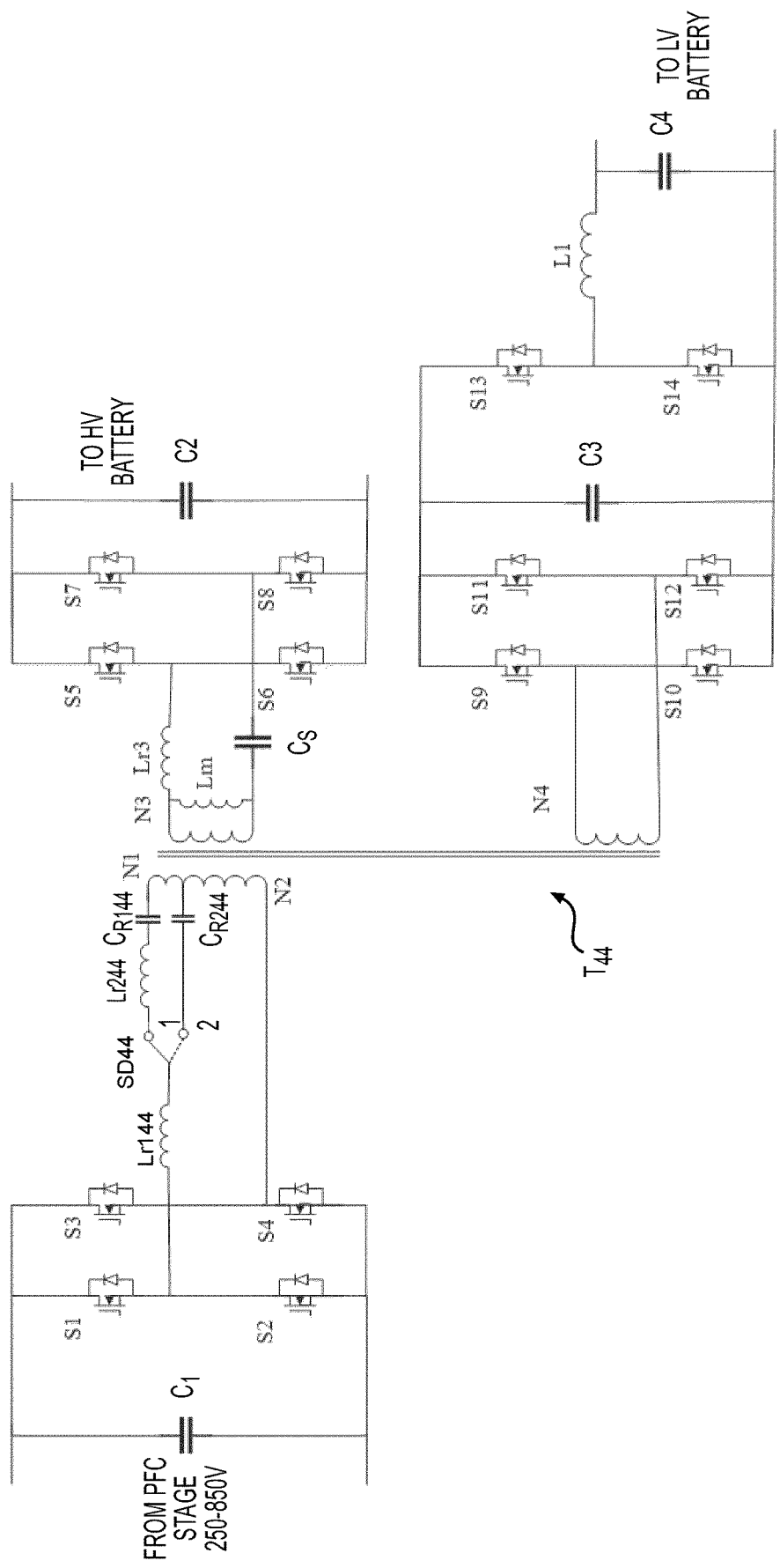

FIGS. 4C & 4D can further comprise an LLC resonant circuit at node N3. A magnetizing inductor Lm and a resonant inductor Lr3 can be included with capacitor CS. Capacitor CS can be a resonant capacitor.

In order to further optimize the system for power density, the circuit in FIG. 4D is proposed to comprise one common resonant inductor Lr144 and a second, optionally smaller, value of resonant inductor Lr244. When the switching device SD44 switches tap position to position 2, and the circuit leg on node N2 is selected, only resonant inductor Lr144 participates in resonance along with resonant capacitor Cr244. When switching device SD44 switches to position 1 on node N1, then the resonant inductor Lr244 in the circuit leg is selected together with resonant capacitor CR144. The total resonant inductance value is found by summing the values for Lr144+Lr244. These inductors, along with resonant capacitor Cr244 will be resonant. The value Lr144, Cr144 and Lr144+Lr244, Cr244 are adjusted so that the resonant frequency and ratio of magnetizing inductance to resonant inductance value is the same for switching device SD44 positions 1 and 2 despite differences in single phase (second mode) and three phase (first mode) input condition.

The solutions in FIGS. 4A-4D have at least the following advantages: high efficiency as the CLLC converter will operate at or near resonant frequency; lower switching frequency variation; lower conduction and switching losses; and ease in design of corresponding EMI filter.

Additional embodiments build on the concepts discussed above. The resonant converter devices disclosed herein can be used in an on-board charger (OBC) with benefits such as capacitor reduction (reduced part count) and magnetics reduction (lower EMI for filtering). The combination of switching devices, such as relays, with the disclosed capacitors, as either a bank capacitor or resonant circuit capacitor, permits the use of smaller capacitors and reduced total number of capacitors, since the capacitors used in the circuits are switchable serially together.

Additional configurations explore such as: switching devices configured to select among each of a plurality of tapped transformers to vary a ratio of the number of windings with respect to a voltage in the resonant converter; switching devices configured to select among each of a plurality of tapped transformers to maintain a predetermined resonant frequency as a voltage in the resonant converter varies; placement and usage of a plurality of resonant capacitors configured to receive one of single phase current or three phase current, the plurality of resonant capacitors selectable by the switching devices to maintain a predetermined resonant frequency; and placement and usage of a plurality of inductors configured to receive variable inductances, the plurality of inductors selectable by the switching devices to maintain a predetermined resonant frequency and a predetermined magnetizing inductance to leakage inductance ratio.

Figure 5:
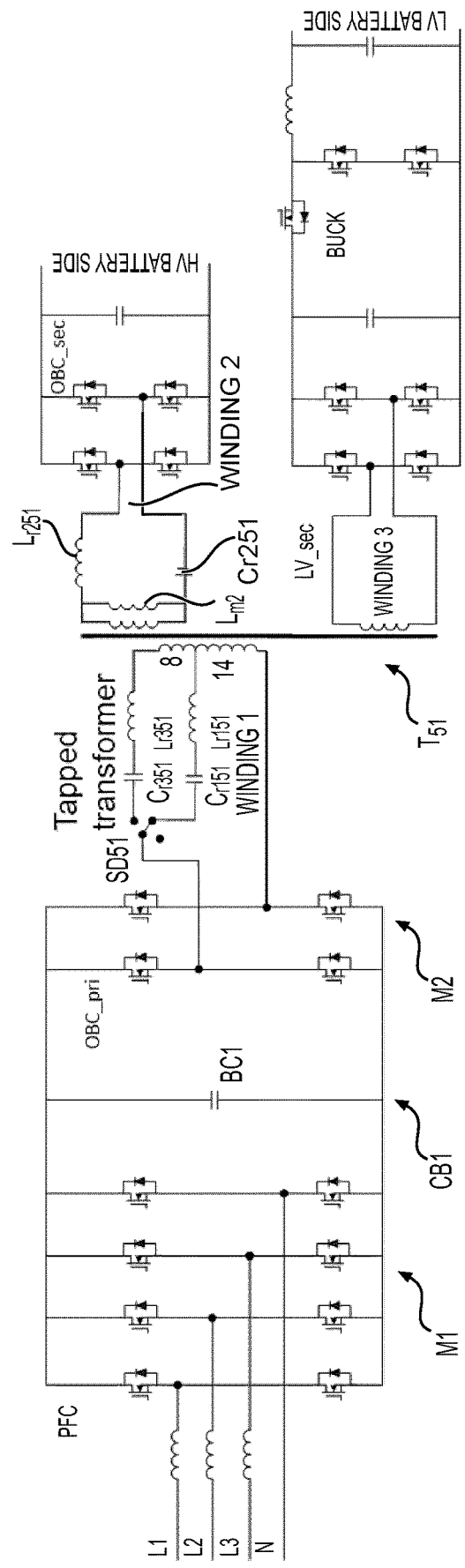
FIG. 5 is a resonant DC/DC converter device comprising a tapped transformer on the primary side coupled to a capacitor bank.

Now, turning to FIG. 5, we show an integrated on board charger and DC/DC converter with capacitor and magnetics reduction. In FIG. 5, a working example is shown for an example 11 kW Integrated On Board Charger and DC/DC converter. A tapped transformer T51 is configured to facilitate 1-phase and 3-phase AC grid bidirectional power transfer. In this design, the DC link capacitance value is selected as per the single phase requirement, due to a higher ripple eg. 2400 uF. The voltage rating, however, is decided by 3-phase operation values, even though the capacitance value required at 3-phase operation is lower, i.e. 900V. This results in the selection of a large capacitance value for one operation mode, with a large voltage rating also needing accommodation. Circuit costs can increase to accommodate the combination of 900V and 2400 uF.

However, in FIG. 5, the combination of a capacitor bank CB1 with the switching device SD51 and MOSFET controls can combine the effect of the bank capacitor BC1 with the LLC resonant circuits shown. Capacitor bank CB1 augments the benefits of the resonant transformer T51 by adding the value of the bank capacitor BC1 to CLLC resonant circuits. The first bank MOSFETs M1 in the capacitor bank CB1 can be manipulated to switch the incoming single or three phase input through the bank capacitor BC1 or not, and further second bank MOSFETs M2 can be manipulated to switch the input through to the switching device SD51.

By tapping the primary winding to have 8 turns and 14 turns, a tapped transformer can be formed for the resonant transformer T51. Circuit legs branching from the primary winding can comprise an empty bottom circuit leg, a first resonant circuit comprising resonant capacitor Cr351 and resonant inductor Lr351 in upper circuit leg, and a second resonant circuit comprising resonant capacitor Cr151 and resonant inductor Lr151 in middle circuit leg. Switching device SD51 has three positions to selectively connect the primary side of the on-board charger (OBC_pri) with the first or second resonant circuit or disconnect the upper and middle circuit legs from the capacitor bank CB1. The empty bottom circuit leg is not switchable in this embodiment.

The on-board charger secondary side (OBC_sec) comprises the HV and LV batteries. MOSFETs are switchable to direct voltage to the respective batteries for charging. The high voltage secondary winding Winding 2 can comprise circuit legs connected with an LLC resonant circuit comprised of a magnetizing inductor Lm2, a resonant inductor Lr251, and a resonant capacitor Cr251. The low voltage secondary winding Winding 3 can comprise a secondary winding with circuit legs connected to MOSFETs, a buck, a coupled inductor, and eventually, the low voltage battery.

In FIGS. 6A-6F alternative switching device control signal flows are shown for exemplary systems. The switching device SD66, SD61 positions are determined by the grid configurations that the OBC is connected to. Also, the vehicle condition including, for example, battery condition signals and various protection signals determine the switching device positions.

In these circuits, it is possible to use relays to put capacitances in series or parallel, as per single phase or three phase requirements. This can result in a first capacitance value selected for single phase operation, but with lower voltage rated capacitor banks of, for example, 500V and 2400 uF. This reduces cost and volume of capacitors (due to switched capacitors) and allows for efficient operation of the OBC (due to the tapped transformer, a.k.a resonant transformer T61, T62).

Also, an alternative capacitor bank CB2 is included. First bank capacitor BC3 and second bank capacitor BC2 are on either side of a pair of relays R2, R3, also called switching device SD66. Each relay R2, R3 of switching device SD66 comprises two positions. First bank MOSFETs MB1 are included in the capacitor bank to route the inputs to the bank capacitors, or not. But, interestingly, the two bank capacitors BC2, BC3 can be connected in series or individually, or not at all to the inputs. Second bank MOSFETs MB2 can be manipulated to direct the inputted signals to the resonant converter device comprising the resonant transformer T61, T62. It is possible to manipulate the first bank MOSFETs MB1 and second bank MOSFETs MB2, along with the bank switching device SD66, to get the desired gains for efficient DC/DC conversion and on-board charging.

Figure 6A:
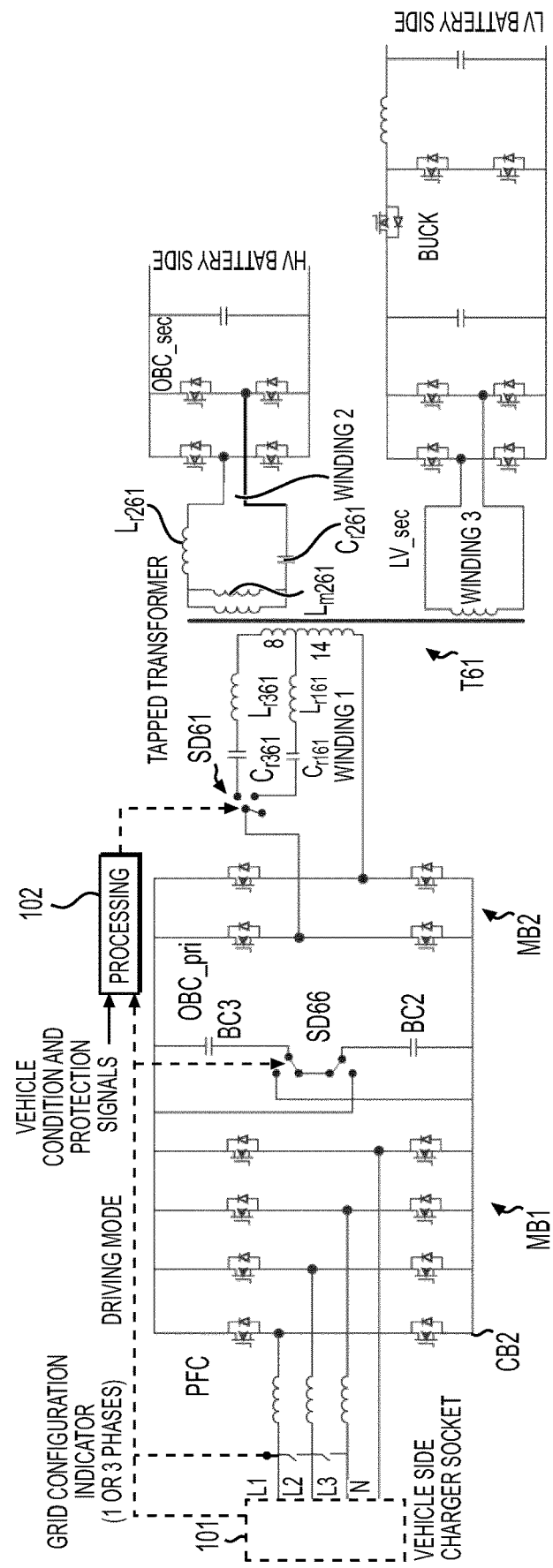
FIGS. 6A-6F show relay control and power flow for a resonant DC/DC converter device.

A schematic vehicle side charger socket 101 is shown for plugging in or otherwise connecting to the single or three phase inputs that will be conducted via lines L1, L2, L3, N. A grid configuration indicator signal can be transmitted to configure the lines for the single or three phase inputs, as by applying the grid configuration indicator signal to switches on the lines L1, L2, L3. The switching device SD66 can also be configured by applying the grid configuration indicator signal. Additional vehicle condition and protection signals can be collected and transmitted for processing. A processing device 102, such as an on-board computer, electronic control unit, or the like, can comprise a processor and stored algorithms to receive and process the vehicle condition and protection signals together with the grid configuration indicator signal. The processor can emit a switch control signal to control switching device SD61 or SD62 & SD63. A voltage measurement can be included with the signals collected by processing device 102. FIG. 6A shows that for a driving mode, the OBC primary side is not connected through the switching device SD61. An inactive $3^{rd}$ position is selected for switching device SD61 before the power is on. If the vehicle condition and protection signals are active, the switching device SD61 will be controlled to switch to position 3.

Switching devices, as claimed, can comprise the MOSFETs, relays such as R2, R3, and the various switching devices SD1, SD2, SD31, SD41, SD 61, etc. The processing device 102 can be connected to control all of the switching devices, or a distributed controller area network (CAN) can be included for distributed processing and manipulation of the various switching devices.

Figure 6B:
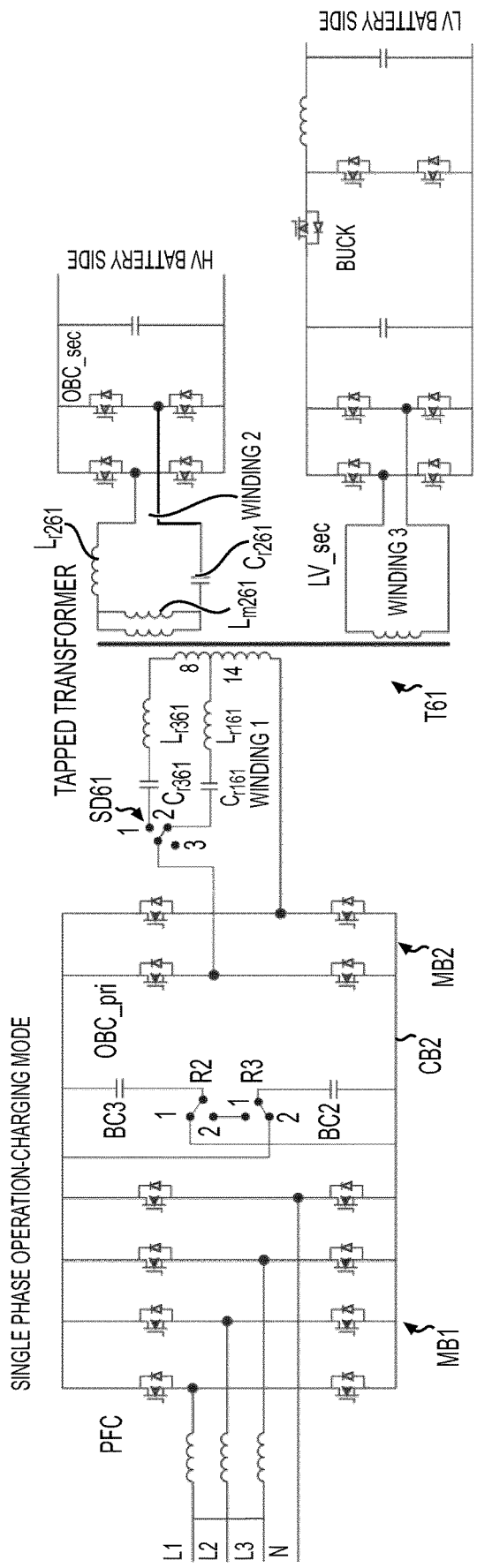

When the processing device 102 detects a charging mode, and the input supplied to the lines L1, L2, L3 comprises a single phase input, the resonant converter device can be configured as shown in FIG. 6B. The lines L1, L2, L3 are switched closed to connect the lines. Relay R2 of switching device SD66 is switched to position 1 while relay R3 of switching device SD66 is switched to position 2. Switched capacitor bank CB2 is configured with the bank capacitors BC3, BC2 in parallel to increase the capacitance applied to the single phase input. Switching device SD61 is switched to position 2 to connect the middle circuit leg, comprising resonant capacitor Cr161 and resonant inductor Lr161, to the tap in primary winding. The tapped transformer is at lower turn ratio. The connection to the single phase electric grid is directed through the capacitor bank CB2 and to the lower half of the tapped primary winding, through the 14 turns and across the transformer core to the secondary OBC side OBC_sec for battery charging.

Figure 6C:
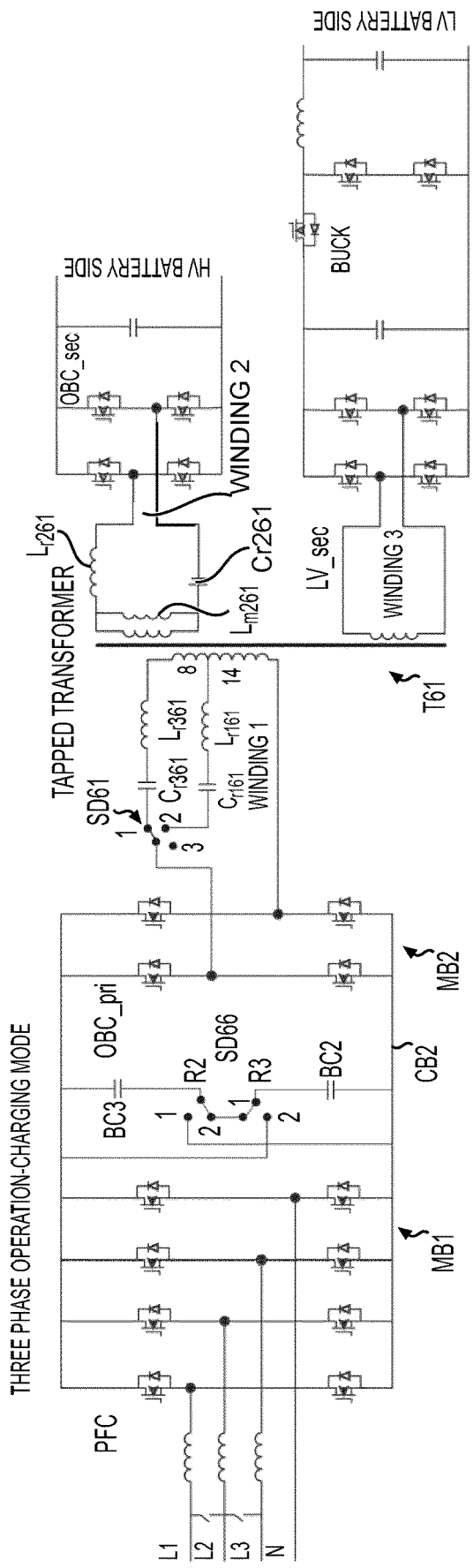

In the 3-phase connection of FIG. 6C, switched capacitor bank CB2 comprises the bank capacitors BC3, BC2 placed in series to withstand a higher DC link voltage. Relay R2 of switching device SD66 is switched to position 2 while relay R3 is switched to position 1. Also, switching device SD61 is switched to position 1 to connect upper circuit leg, comprising resonant capacitor Cr361 and resonant inductor Lr361, to Winding 1 such that 8+14=22 windings are connected as the selectable primary winding. The tapped transformer T61 is at a higher turns ratio. With MOSFET control on the HV battery side of the OBC_sec, voltage can transfer across Winding 2 and through LLC resonant circuit comprising magnetic inductor Lm261, resonant inductor Lr261, and resonant capacitor Cr261 to charge the HV battery. With control of the MOSFETs on the LV battery side, and with safety control of the MOSFETs at the buck, voltage can transfer across Winding 3 to charge the LV battery. The number of MOSFETs at the buck can vary for redundancy or other purposes, with 2 or 3 MOSFETs at the buck being preferable.

Figure 6D:
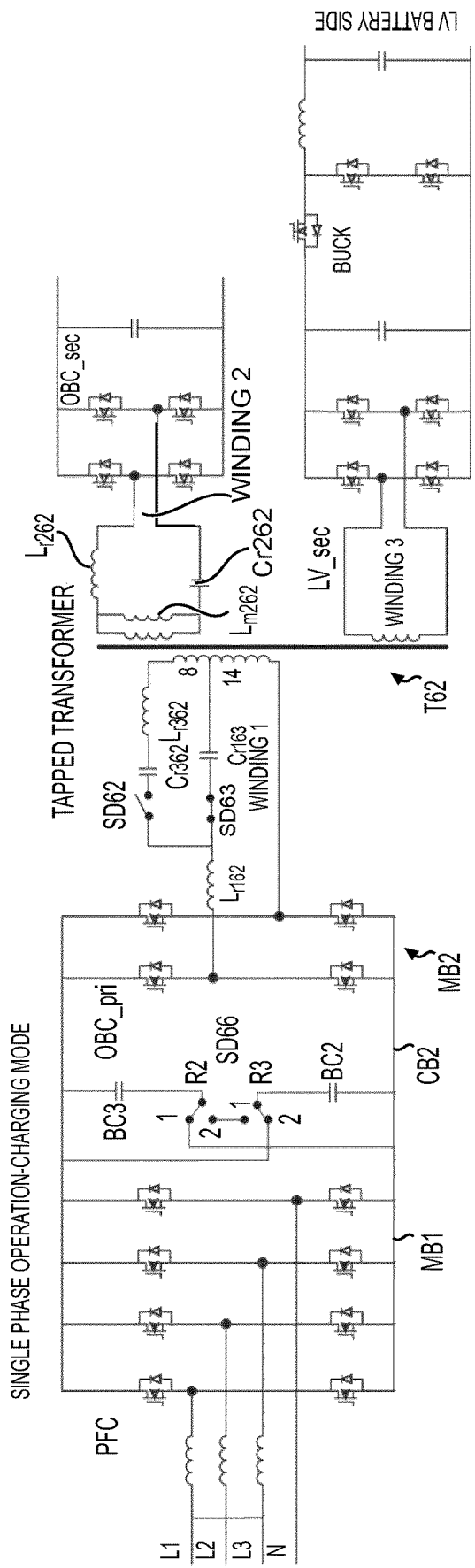

In FIG. 6D, an alternative charging mode for a single phase operation is shown. The capacitor bank CB2 is configured as before. But, this circuit comprises alternative switching devices SD62, SD63. Now, switching device SD62 is open, which disconnects circuit leg comprising resonant capacitor Cr362 and resonant inductor Lr362 from the tapped primary winding. The top 8 turns are deselected by the open switching device SD62. But, the common resonant inductor Lr162 is connected by closed switching device SD63 to the middle circuit leg comprising resonant capacitor Cr163. The lower 14 turns of the tapped primary winding are connected to transfer voltage across the tapped transformer T62 of the OBC. With MOSFET control, as before, the voltage can be controlled as to the destination battery.

Figure 6E:
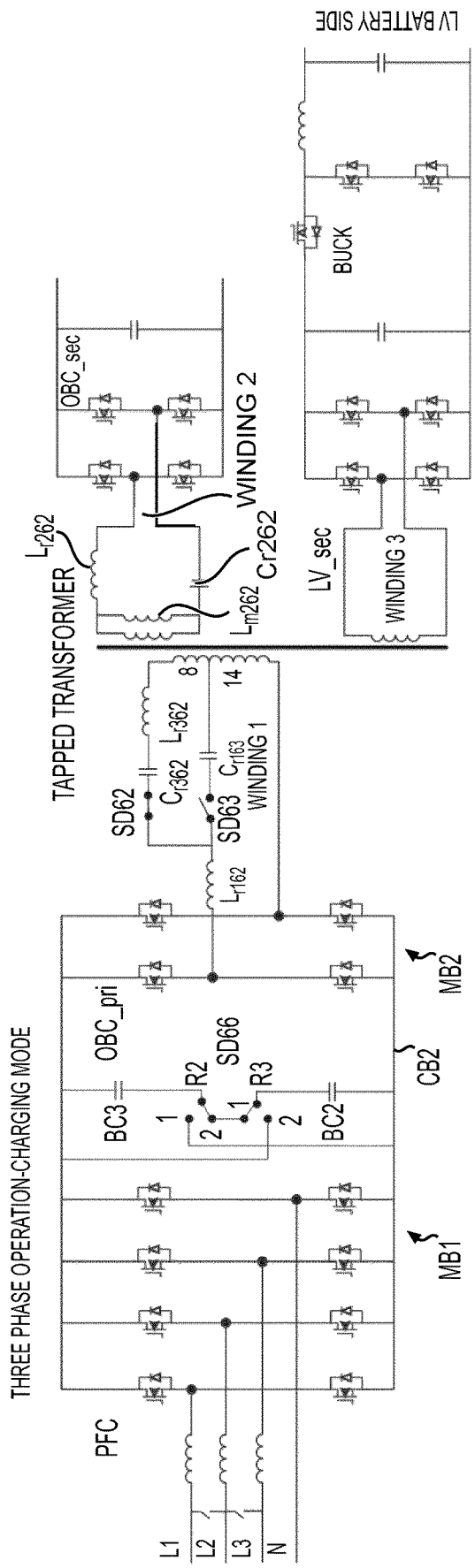

In FIG. 6E, a charging mode for a 3-phase operation is shown. The capacitor bank CB2 is controllable as above. And, the line switches, as above, are disconnected to decouple lines L1, L2, L3. But now, the common resonant inductor Lr162 is added by the closed switching device SD62 to the upper circuit leg comprising the resonant capacitor Cr362 and resonant inductor Lr362. The middle circuit leg is disconnected by the open switching device SD63. All 22 turns of the primary winding are resonant for transfer of voltage across the tapped transformer T62 to be drawn on by the secondary windings of the OBC_sec.

Figure 6F:
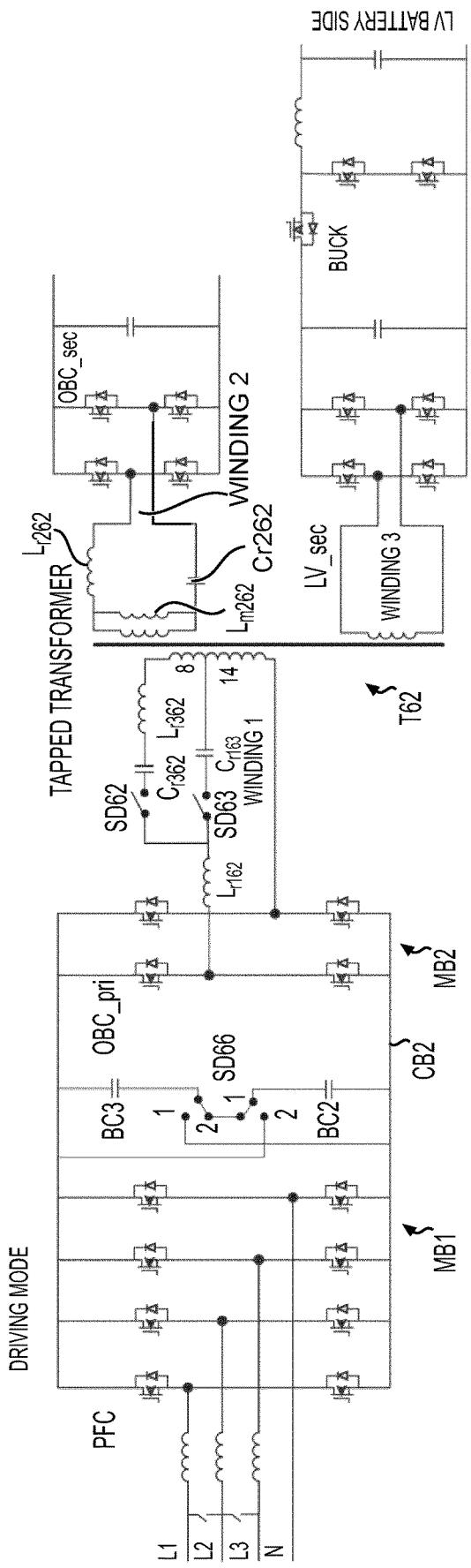

In FIG. 6F, an alternative driving mode is shown. If the vehicle is running in driving mode, either before the power is on at the vehicle side charger socket 101 or when the vehicle condition and protection signals are active to the processing device 102, the switching devices SD62, SD63 will be opened to disconnect the secondary OBC side OCB_sec from the primary OBC side OBC_pri.

Figure 7A:
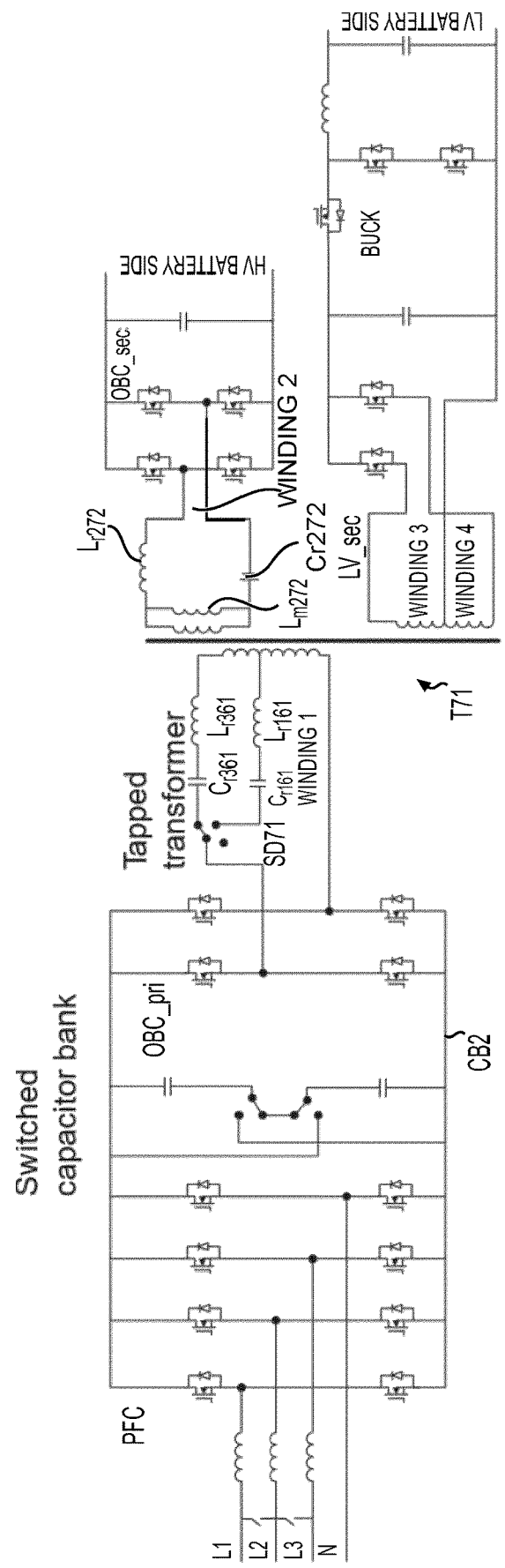
FIGS. 7A-7O show alternative resonant DC/DC converter devices comprising extrinsic resonant inverters and extrinsic resonant capacitors.

In FIGS. 7A-7O, additional topology variants are provided. In some topologies, the switching devices move to show alternative ways to accomplish the objectives of the resonant transformers. Also, the combinations of tapped primary and tapped secondary windings and other combinations of switchable primary windings are shown. Mostly, the tapped secondary windings are shown on the LV battery side. Viewing the figures, the number and location of relays can be varied, the reliance of the connected pathways on the inductors or capacitors connected to the relays can be varied, the values of the capacitors and inductors in the tapped transformers can be more tailored to the specific voltages in the HV and LV sides, so too can the values be tailored to the capacitor bank side, and, the switching device used to open or close to connect the capacitor or inductor to the switched capacitor bank side or battery side can be tailored.

FIG. 7A is similar in many respects to FIG. 6A, and the similarities are incorporated hereinbelow. FIG. 7A comprises a tapped secondary winding with Windings 3 & 4 in the LV battery side. The turn ratio of the tapped transformer T71 can be tailored both by the switching device SD71 and by the MOSFET control on the LV battery side, with resulting benefits inured by the controlled turns ratios. Aspects of FIG. 7A are repeated in FIGS. 8A & 8B and discussed more below.

Figure 7B:
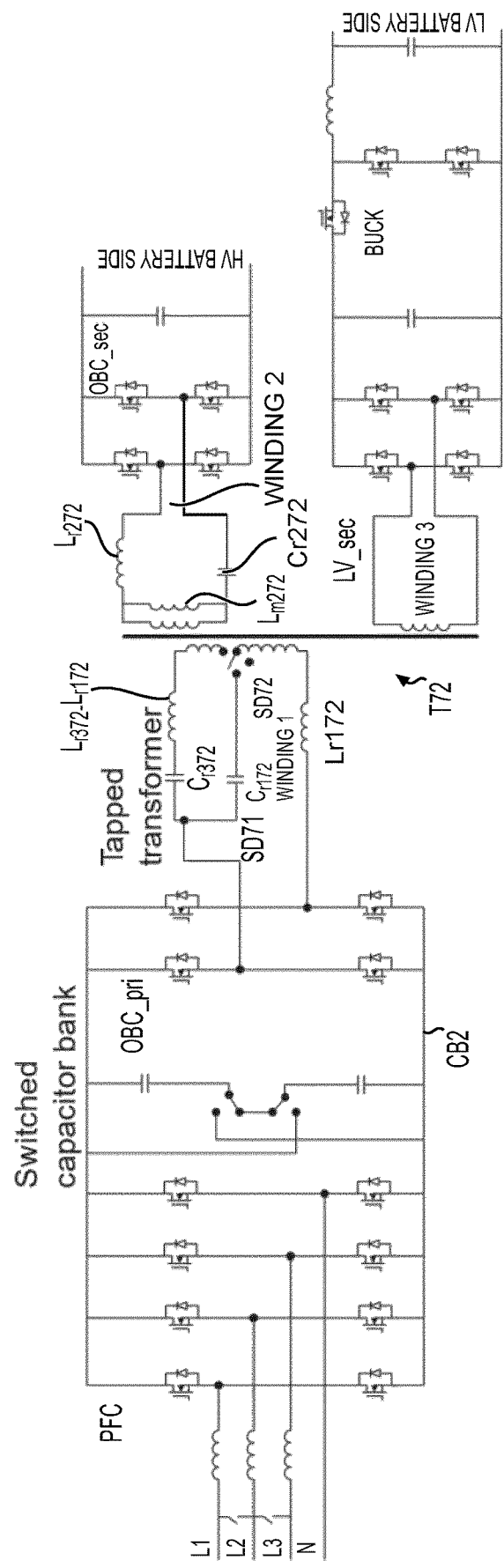

FIG. 7B comprises the switchable capacitor bank CB2, controllable as in other embodiments, combined with a switching device SD72 in the primary winding. The upper circuit leg can be selected to comprise resonant capacitor Cr372 and a resonant inductor of a value Lr172 minus the value of resonant inductor Lr172. With the upper circuit leg connected by the switching device SD72, all turns of the primary Winding 1 are connected. And, bottom circuit leg comprising resonant inductor Lr172 is connected to upper circuit leg. Switching device SD72 can be controlled also to connect to middle circuit leg, and thereby connect the capacitor bank CB2 to resonant capacitor Cr172 in middle circuit leg and to resonant inductor Lr172 in bottom circuit leg through only the lower half of the tapped primary winding. A disconnect position is also available for switching device SD72. MOSFET control of Winding 3 on LV battery side and MOSFET control of the HV battery side resonant circuit with magnetizing inductor Lm272, resonant inductor Lr272, and resonant capacitor Cr272 can be done similarly to other embodiments. Aspects of FIG. 7B are repeated in FIG. 8C, with resonant transformer T83 comprising intrinsic secondary resonant inductance and the secondary winding of the HV resonant circuit comprising resonant capacitor Cr28 and magnetizing inductor Lm28.

Figure 7C:
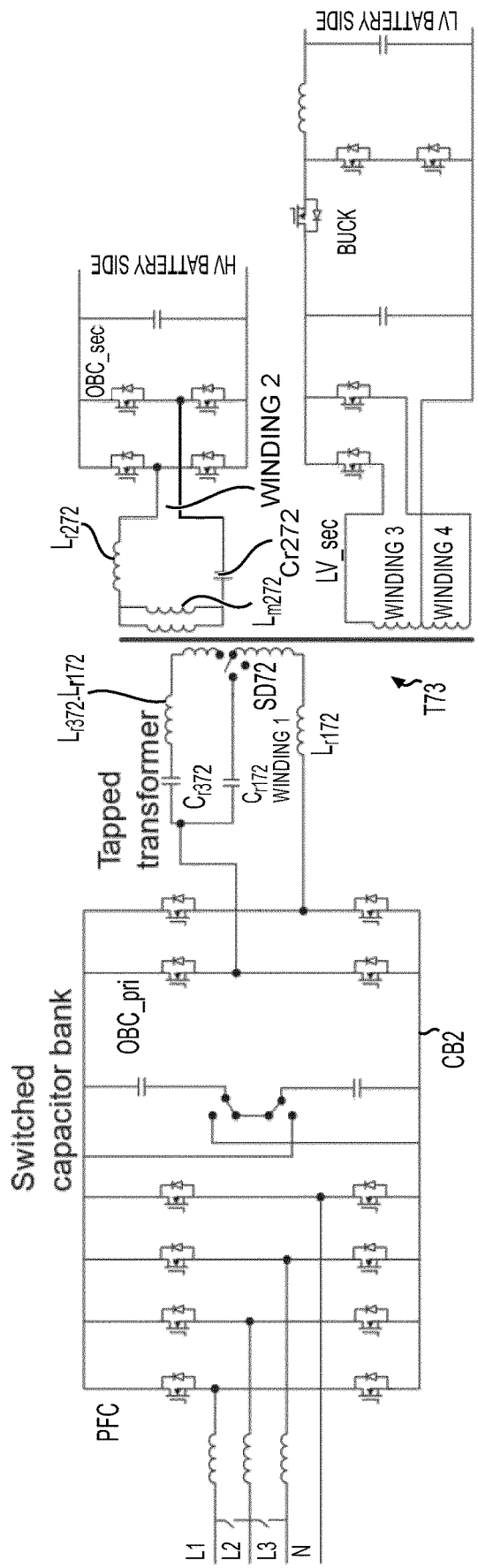

FIG. 7C is similar to FIG. 7B and features are incorporated from above. But, it is noteworthy that tapped transformer T73 comprises a tapped secondary winding at Windings 3 & 4, increasing the control over the turns ratio. Aspects of FIG. 7C are repeated in FIG. 8D, with resonant transformer T84 comprising intrinsic secondary resonant inductance and the secondary winding of the HV resonant circuit comprising resonant capacitor Cr28 and magnetizing inductor Lm28.

Figure 7D:
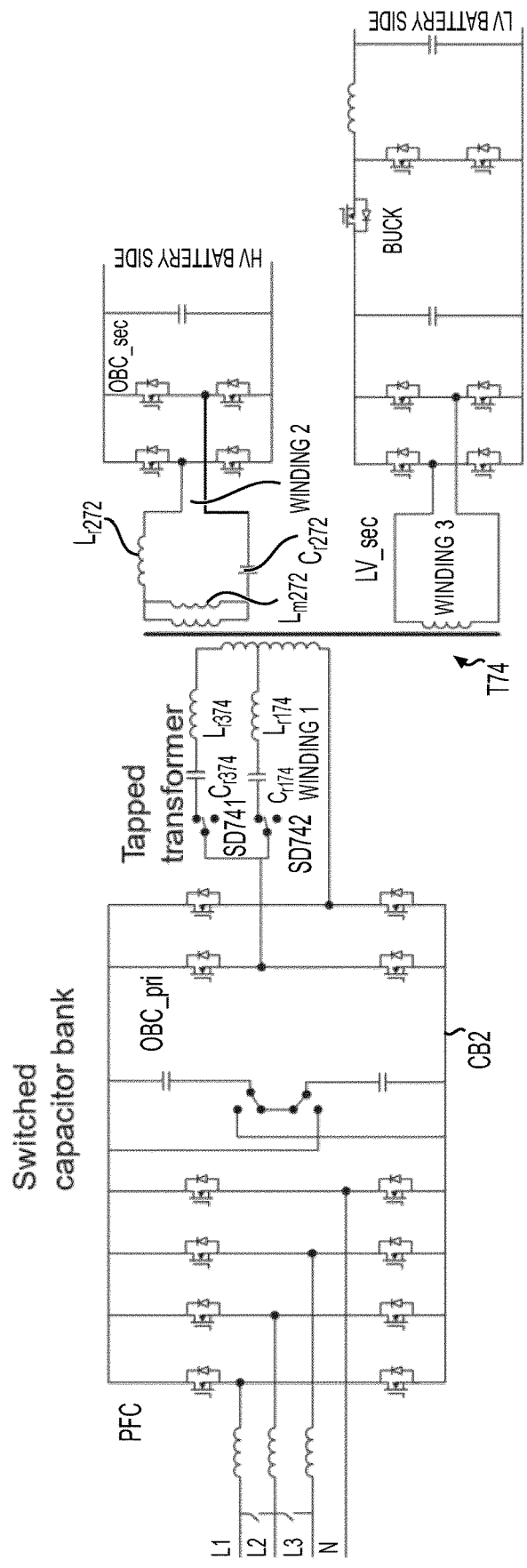

FIG. 7D comprises two switching devices SD741, SD742 coupled to the switched capacitor bank CB2. An upper circuit leg, comprising resonant capacitor Cr374 and resonant inductor Lr374 can be connected or disconnected to the tapped primary winding by a two-position relay forming switching device SD741. The middle circuit leg, comprising resonant capacitor Cr174 and resonant inductor Lr174 can be connected or disconnected to the lower winding of the tapped primary winding by a second two-position relay forming switching device SD742. There are two connections to the switched capacitor bank CB2, via a common leg and bottom circuit leg, but there are three circuit legs joined to the tapped primary winding of the tapped transformer T74. Aspects of FIG. 7D are repeated in FIG. 8E, with resonant transformer T85 comprising intrinsic secondary resonant inductance and the secondary winding of the HV resonant circuit comprising resonant capacitor Cr28 and magnetizing inductor Lm28.

Figure 7E:
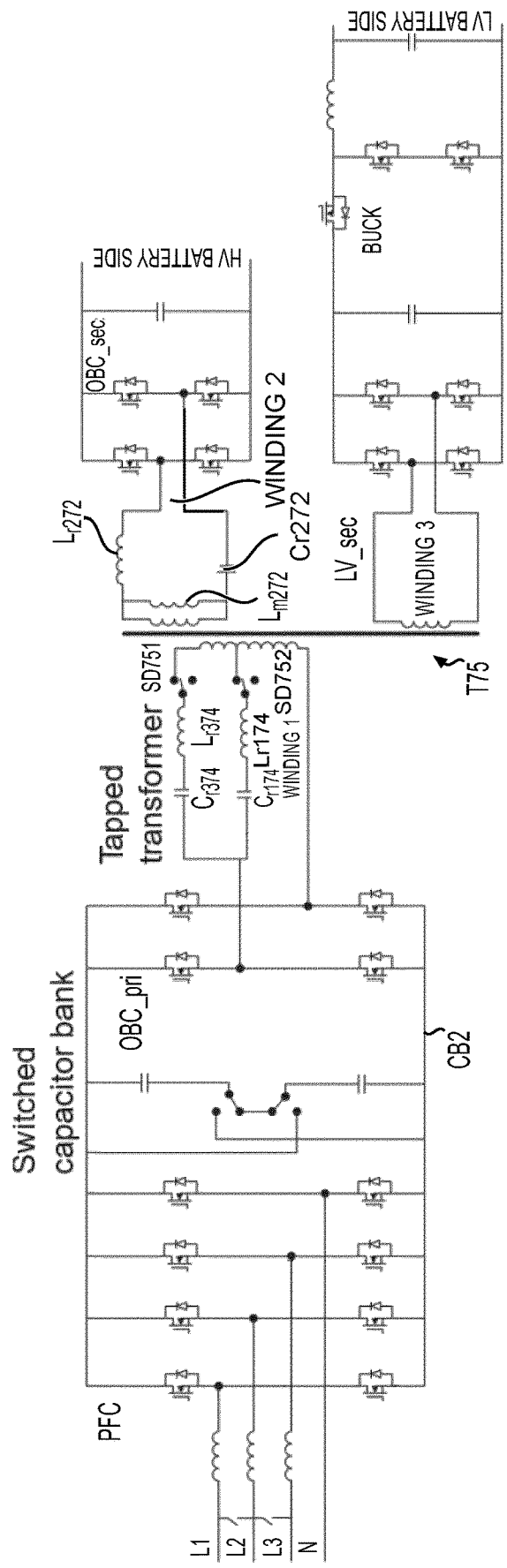

FIG. 7E has many similarities incorporated from above. However, the locations of the switching devices SD751, SD752 have moved adjacent to the primary winding of the tapped transformer T75 so that the resonant capacitors Cr374, Cr174 and resonant inductors Lr374, Lr174 are between the common leg and the switching devices. Aspects of FIG. 7E are repeated in FIG. 8F, with resonant transformer T86 comprising intrinsic secondary resonant inductance and the secondary winding of the HV resonant circuit comprising resonant capacitor Cr28 and magnetizing inductor Lm28.

Figure 7F:
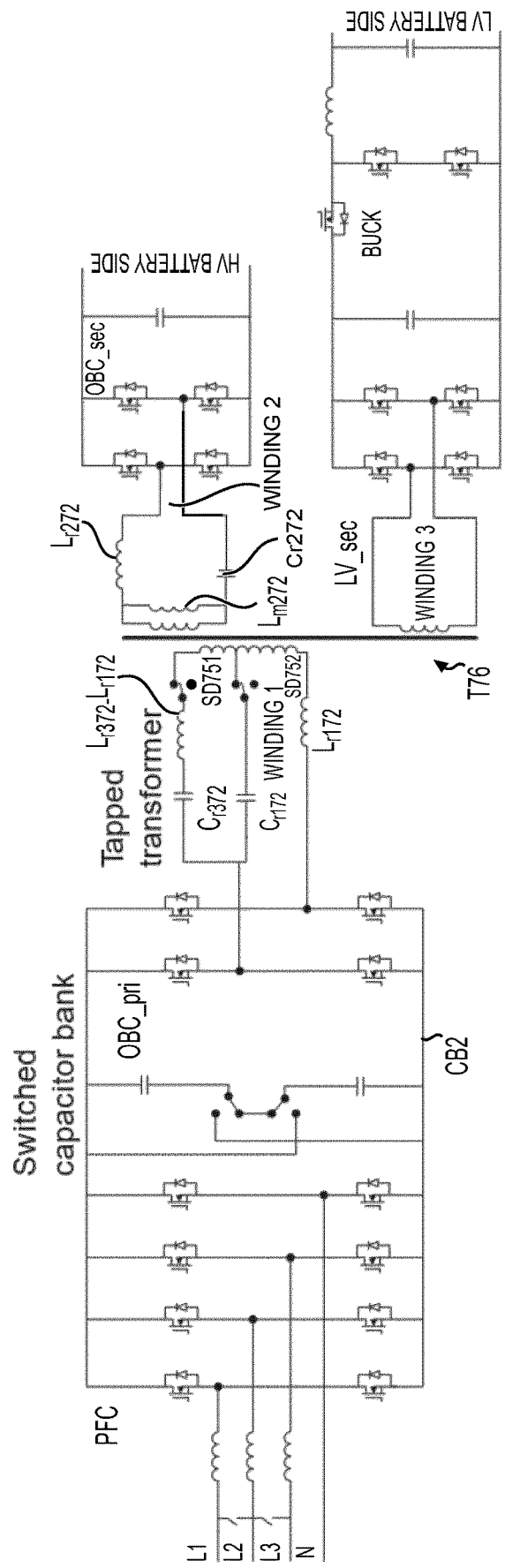

FIG. 7F comprises similarities to FIGS. 7C & 7E that are incorporated. However, the locations of the switching devices SD751, SD752 have moved adjacent to the primary winding of the tapped transformer T76 so that the resonant capacitors Cr372, Cr172 and resonant inductors Lr372 minus Lr172 are between the common leg and the switching devices. The resonant inductor Lr172 remains on the bottom circuit leg of the primary winding. Aspects of FIG. 7F are repeated in FIG. 8G, with resonant transformer T87 comprising intrinsic secondary resonant inductance and the secondary winding of the HV resonant circuit comprising resonant capacitor Cr28 and magnetizing inductor Lm28.

Figure 7G:
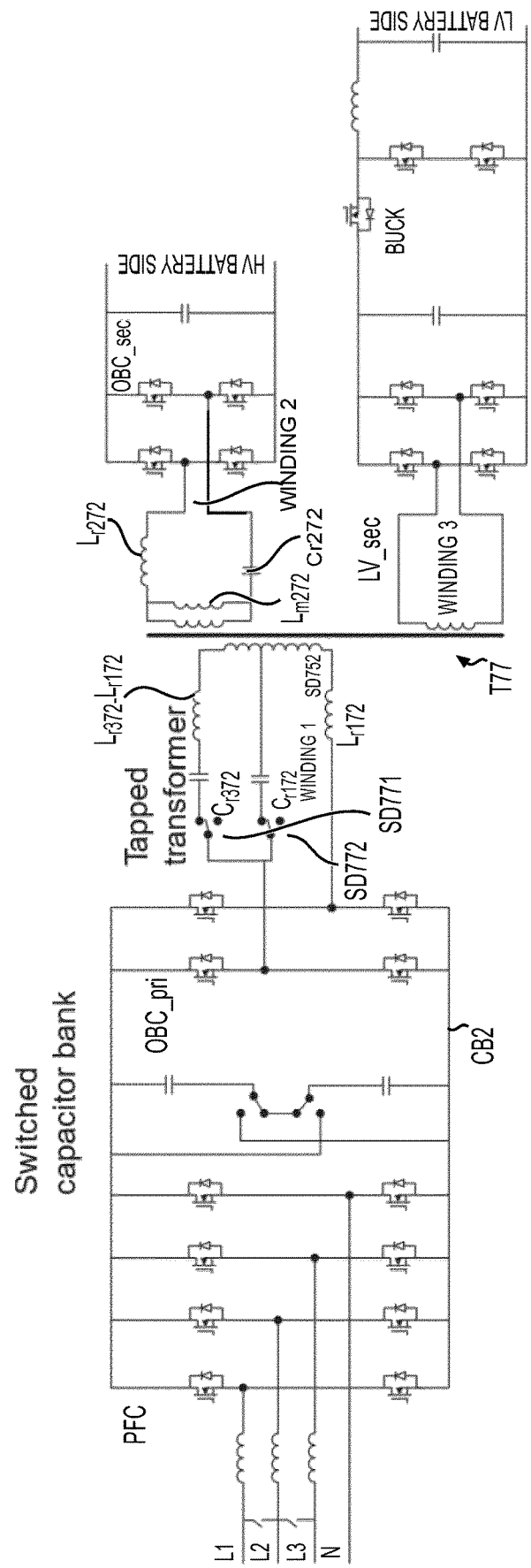

FIG. 7G comprises similarities to FIG. 7F that are incorporated. However, the locations of the switching devices SD771, SD772 have moved to be adjacent to the common leg connected to the switched capacitor bank CB2. Now, the resonant capacitors Cr372, Cr172 and resonant inductors Lr372 minus Lr172 are between the switching devices and primary winding of the tapped transformer T77. The resonant inductor Lr172 remains on the bottom circuit leg of the primary winding. Aspects of FIG. 7G are repeated in FIG. 8H, with resonant transformer T88 comprising intrinsic secondary resonant inductance and the secondary winding of the HV resonant circuit comprising resonant capacitor Cr28 and magnetizing inductor Lm28.

Figure 7H:
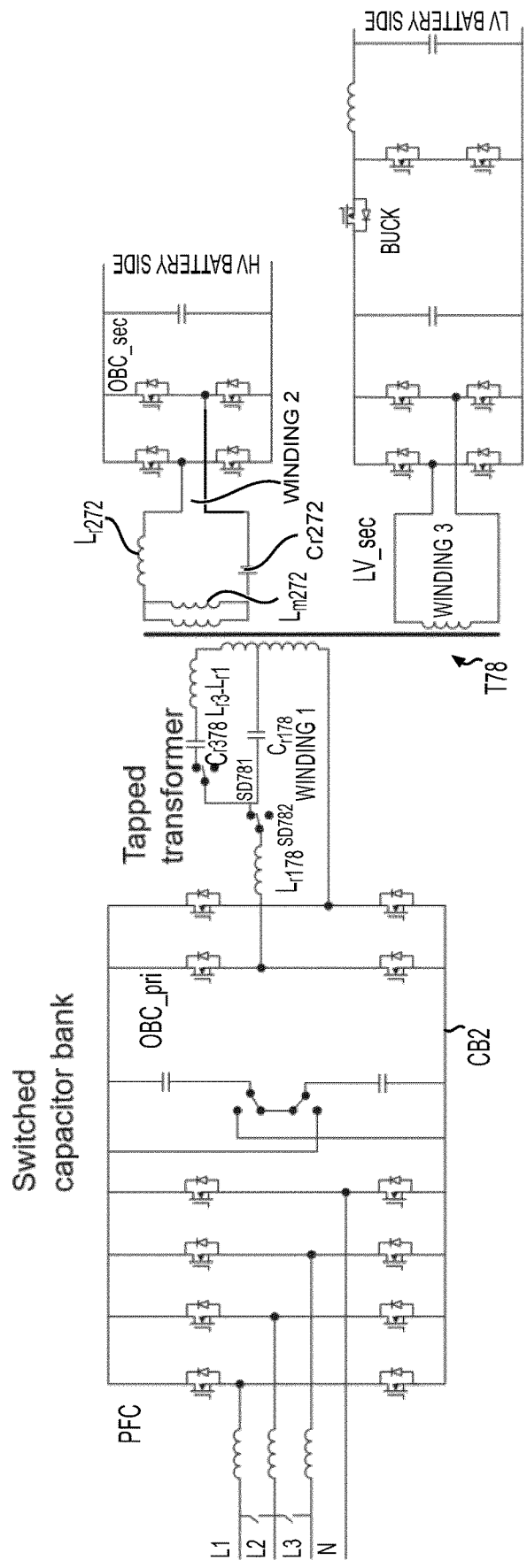

Common elements of FIG. 7H are incorporated. But, a resonant inductor Lr178 is added to the common leg connecting the switched capacitor bank CB2 to the circuit legs of the primary winding. Switching device SD782 can disconnect the primary tapped winding from the switched capacitor bank CB2. Or, switching device SD782 can connect the resonant inductor Lr178 to both the middle circuit comprising resonant capacitor Cr178 and the upper circuit leg comprising switching device SD781, resonant capacitor Cr378, and resonant inductor comprising a value of Lr378 minus Lr178. Upper circuit leg, when connected by switching device SD781, connects to the whole tapped transformer T78 for including the most turns on the primary winding side. Middle circuit leg connects to the primary winding at the tap. Aspects of FIG. 7H are repeated in FIG. 8I, with resonant transformer T89 comprising intrinsic secondary resonant inductance and the secondary winding of the HV resonant circuit comprising resonant capacitor Cr28 and magnetizing inductor Lm28.

Figure 7I:
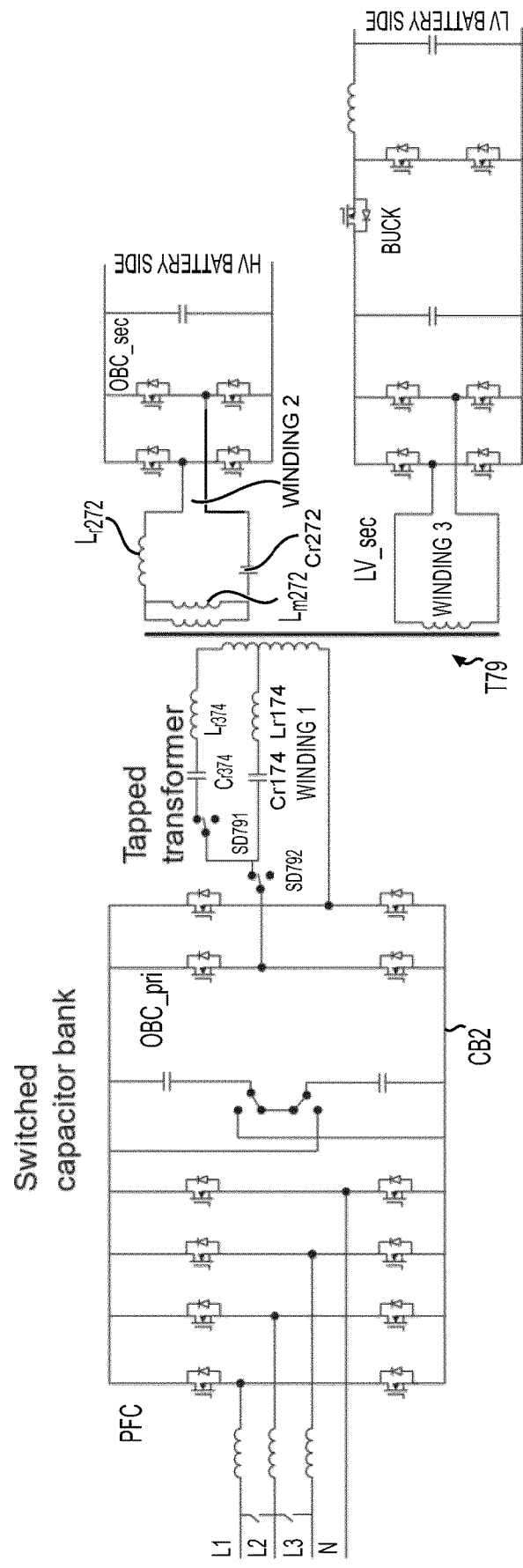

FIG. 7I comprises similarities to FIG. 7D, incorporated. FIG. 7I includes two switching devices SD791, SD792, but these are located alternatively to FIG. 7D. Switching device SD792 is located on the common leg, a feature that can disconnect the primary winding from the capacitor bank CB2 in one switching motion. When switching device SD792 is connected to conduct power, the voltage can be directed along the middle circuit leg to resonant capacitor Cr174 and resonant inductor Lr174 along with half of the tapped transformer turns of resonant transformer T79. Or, with switching device SD791 switched from open to closed, the voltage can be directed along the upper circuit leg to resonant capacitor Cr374 and resonant inductor Lr374. All turns of the tapped primary winding can be connected to the upper circuit leg. Aspects of FIG. 7I are repeated in FIG. 8J, with resonant transformer T811 comprising intrinsic secondary resonant inductance and the secondary winding of the HV resonant circuit comprising resonant capacitor Cr28 and magnetizing inductor Lm28.

Figure 7J:
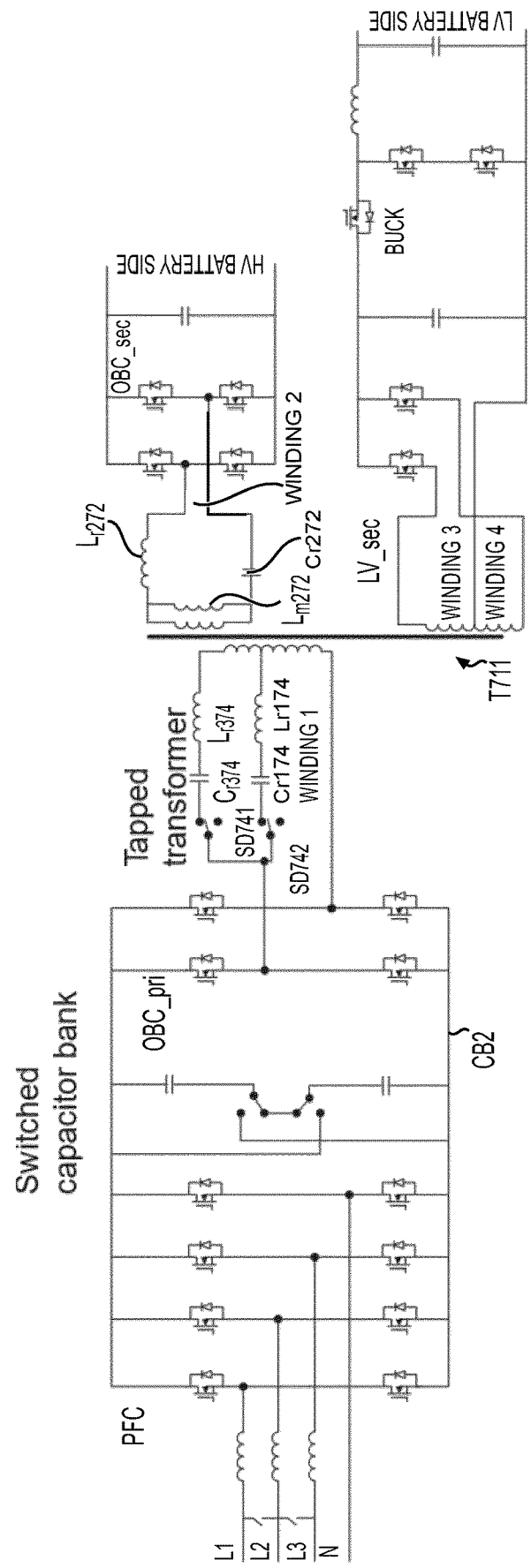
Figure 7K:
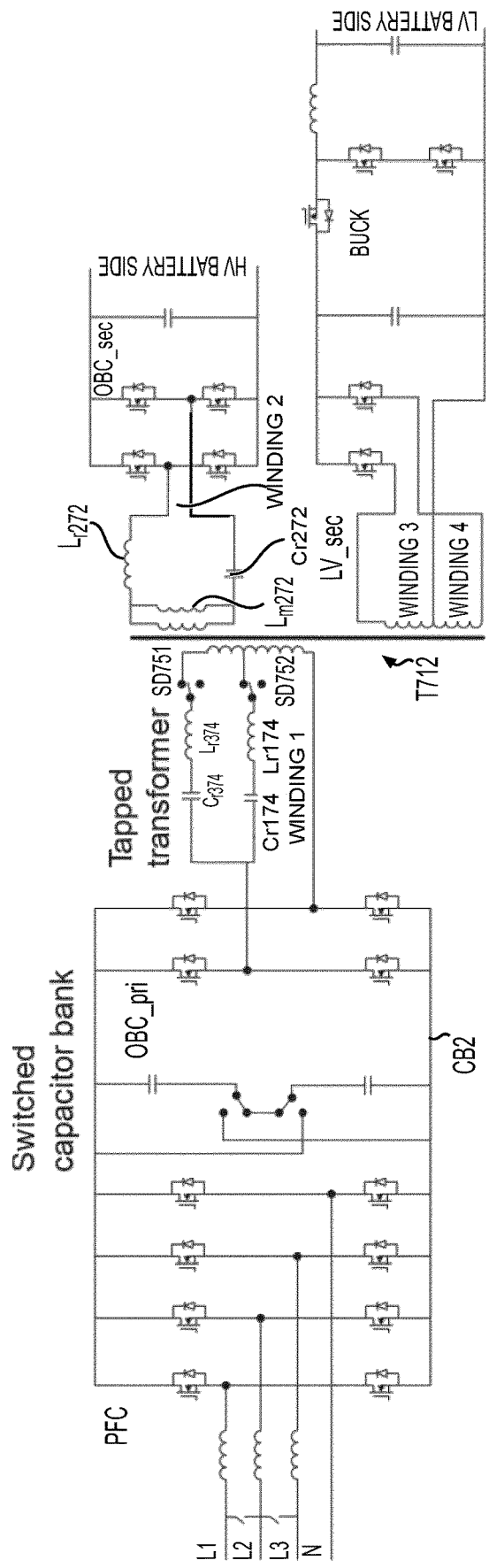

FIGS. 7J & 7K comprise similarities to FIG. 7D which are incorporated. However, the tapped transformer T711 differs by comprising a tapped primary winding Winding 1 and a tapped secondary winding at Windings 3 & 4. And, resonant transformer T812 differs by comprising an intrinsic secondary resonant inductance such that the secondary winding of the HV resonant circuit comprises a resonant capacitor Cr28 and magnetizing inductor Lm28 but the resonant circuit does not comprise an extrinsic resonant inductor to couple voltage to the HC battery side.

Figure 8A:
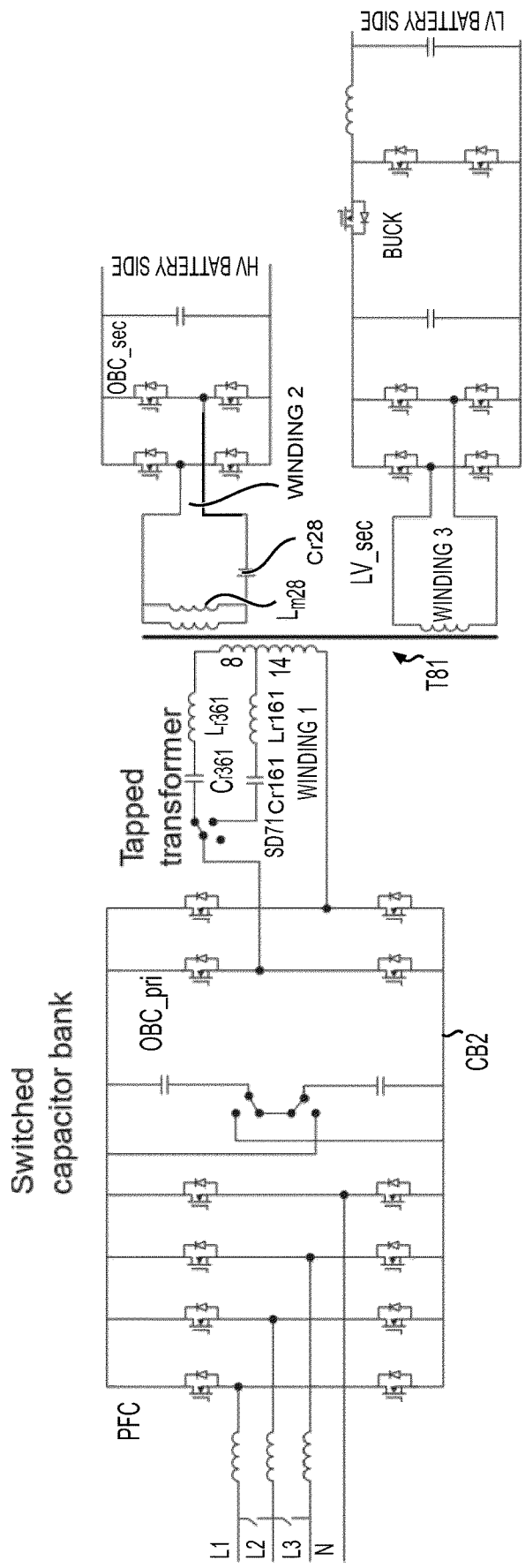
FIGS. 8A-8P show alternative resonant DC/DC converter devices comprising intrinsic resonant inverters and extrinsic resonant capacitors.
Figure 8B:
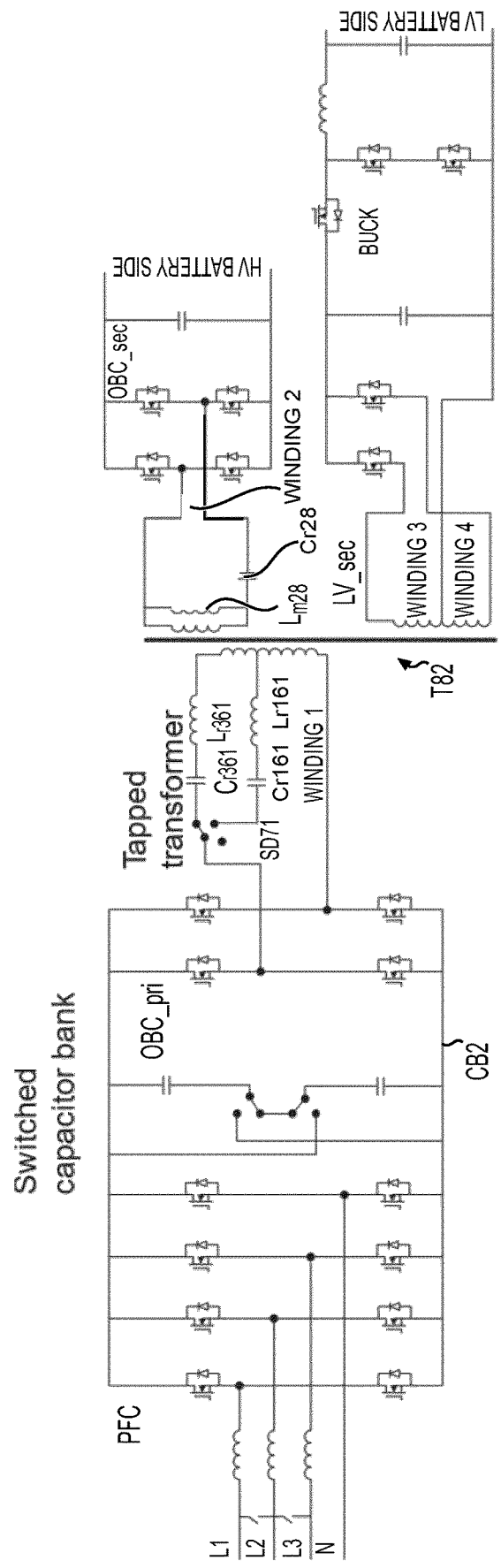
Figure 8C:
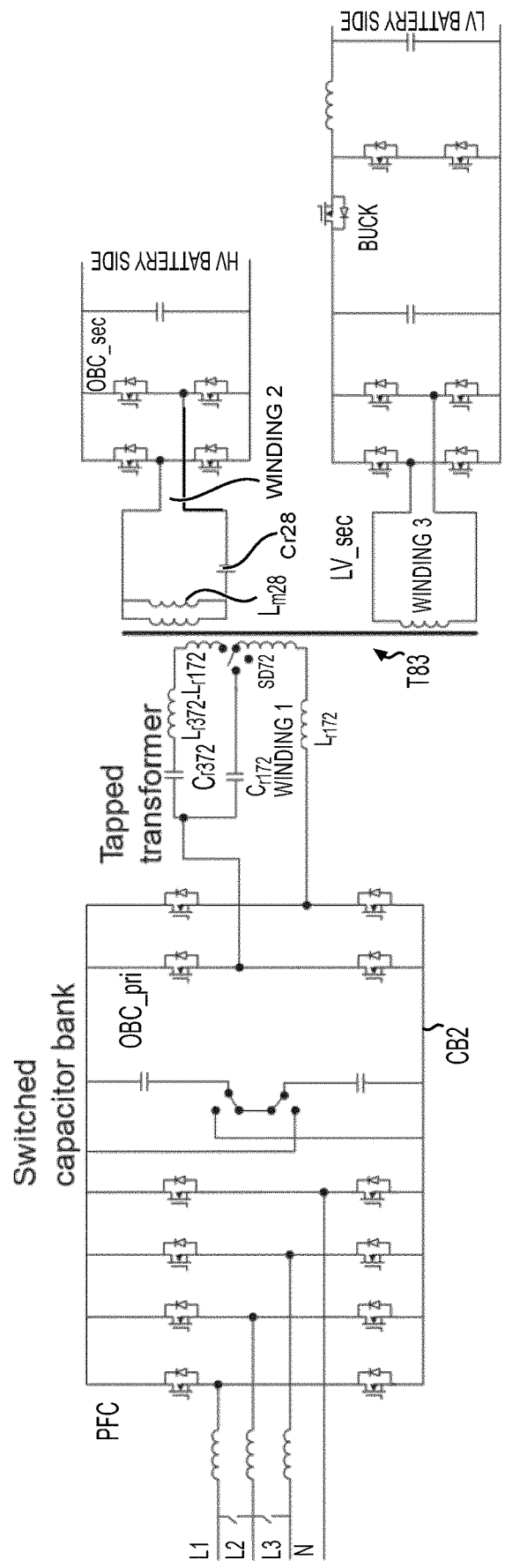
Figure 8D:
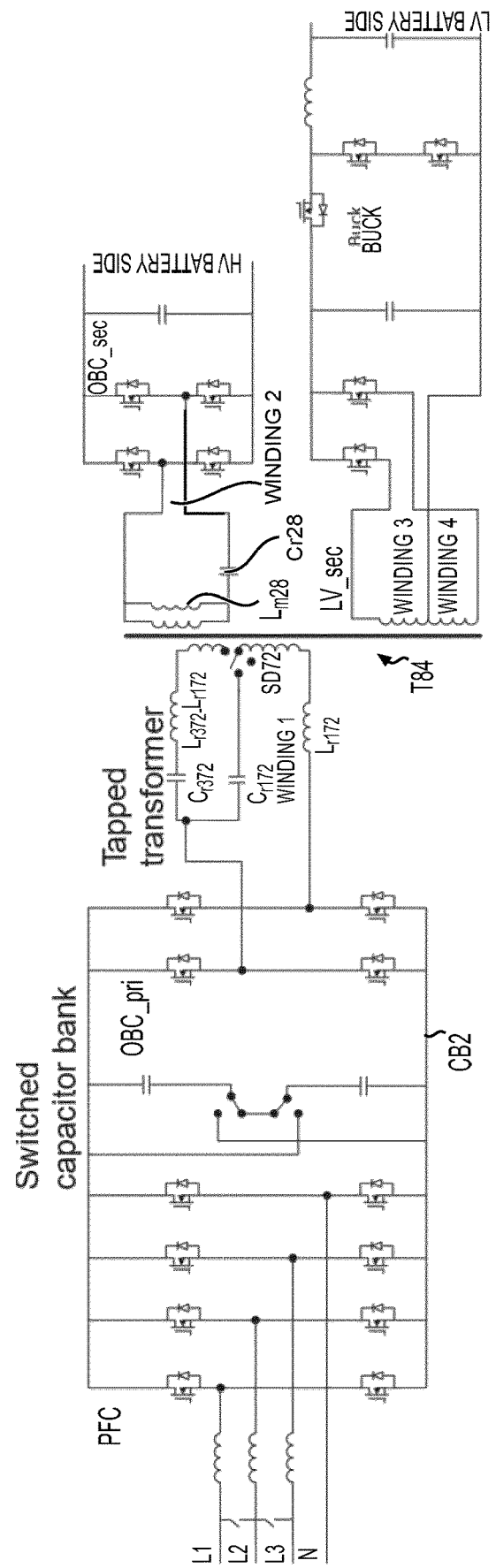
Figure 8E:
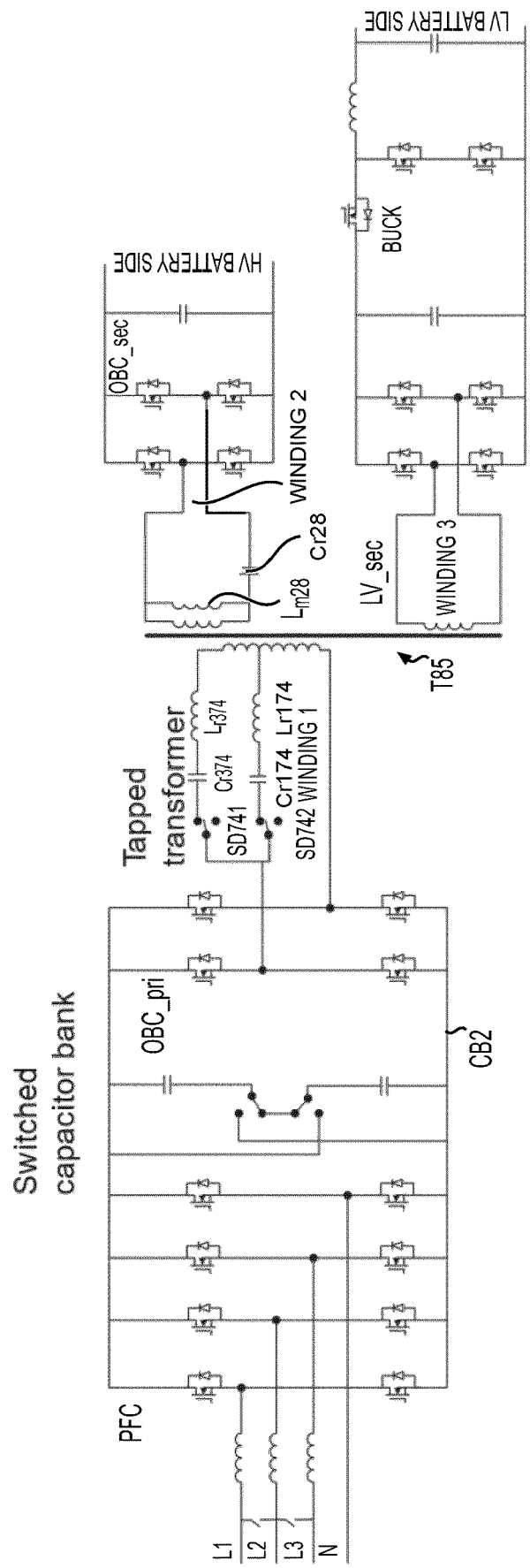
Figure 8F:
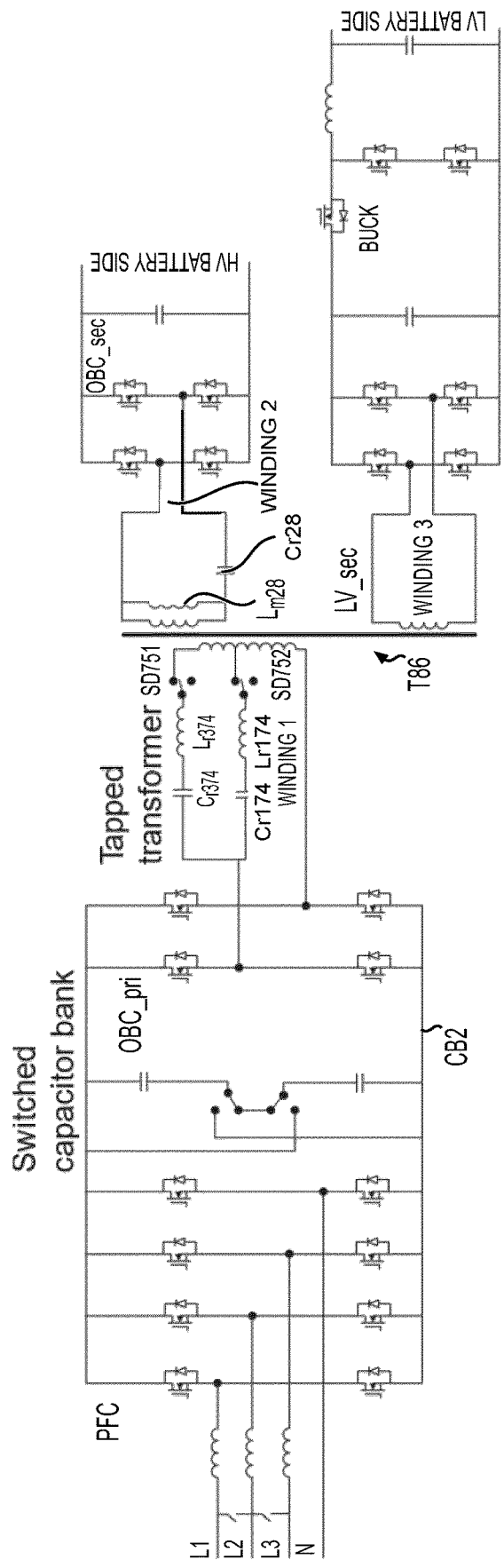
Figure 8G:
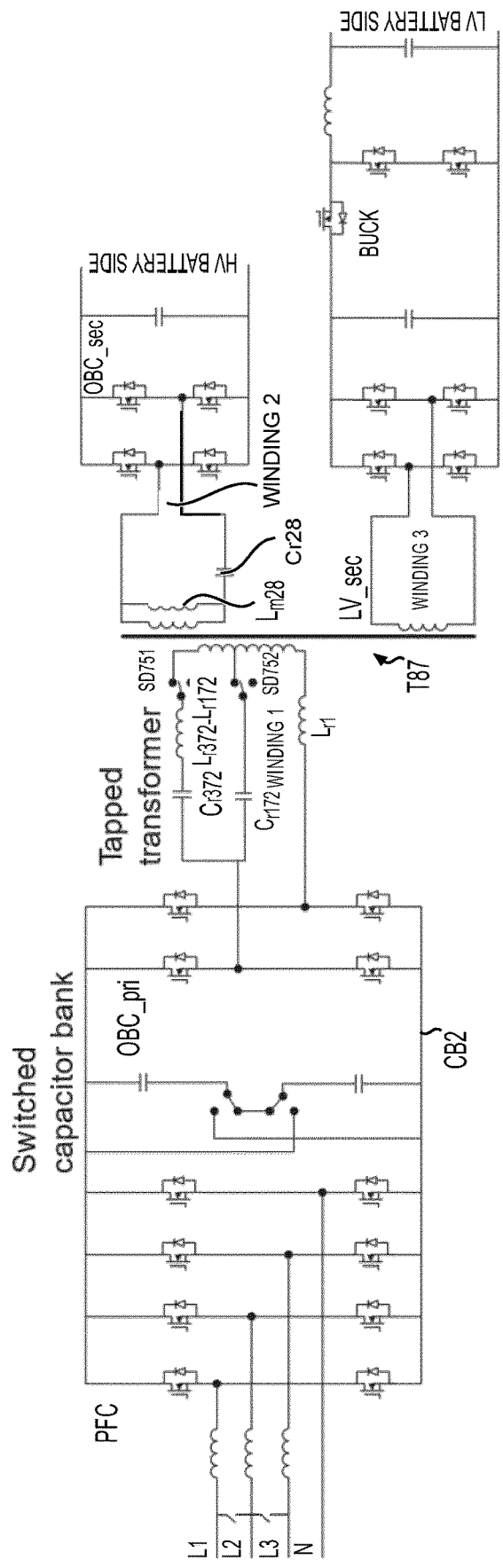
Figure 8H:
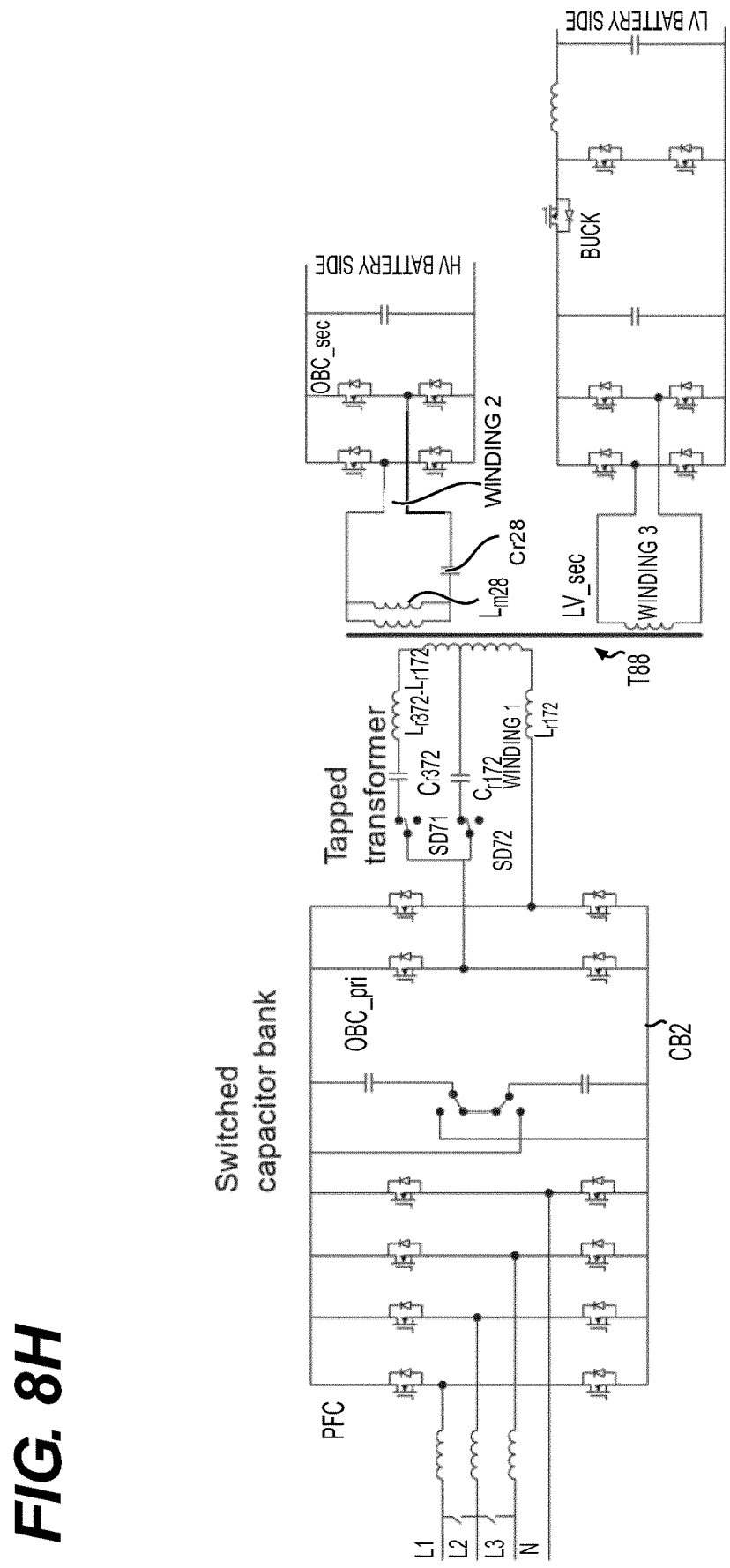
Figure 8I:
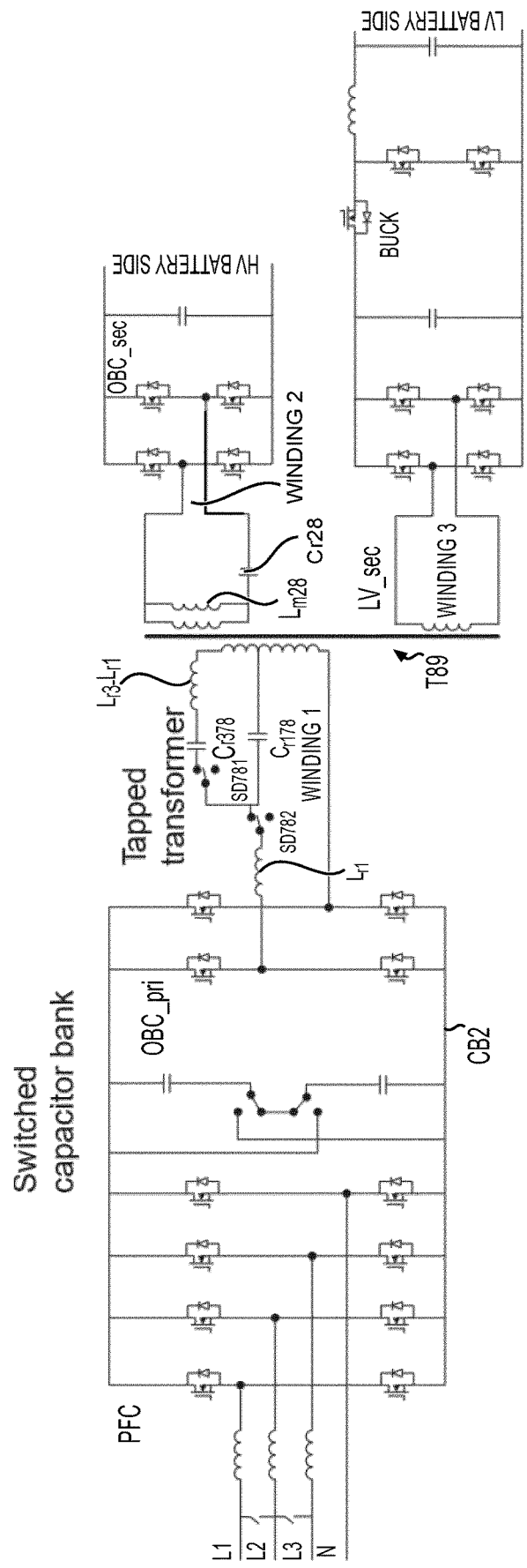
Figure 8J:
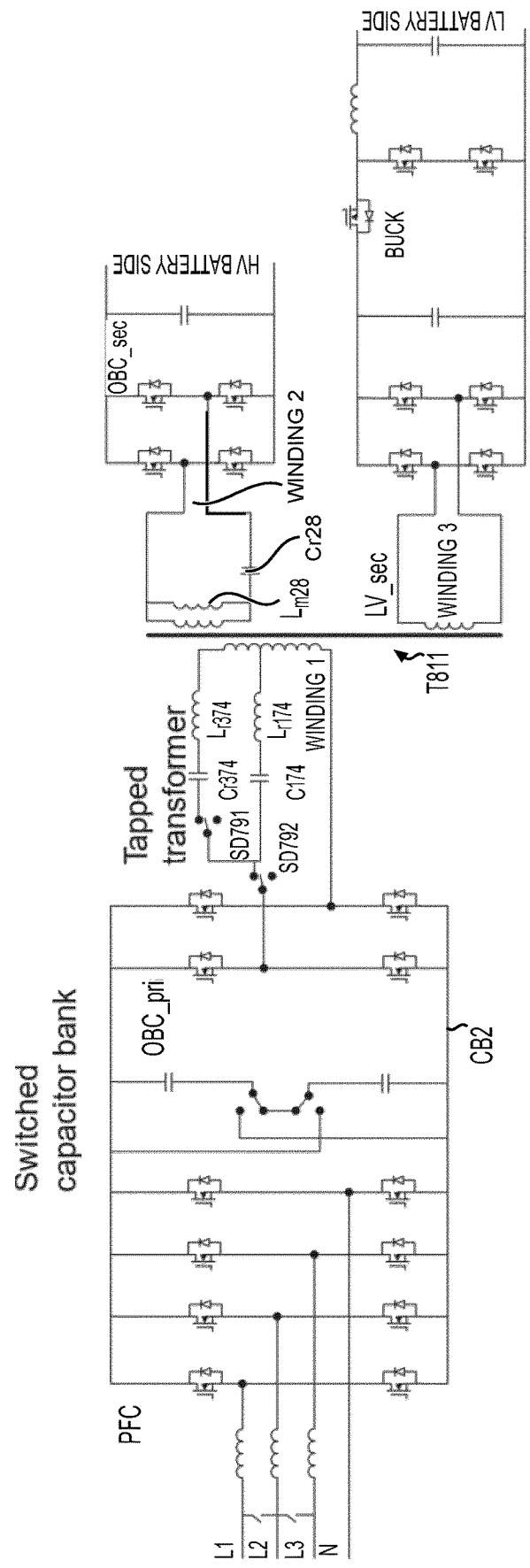
Figure 8K:
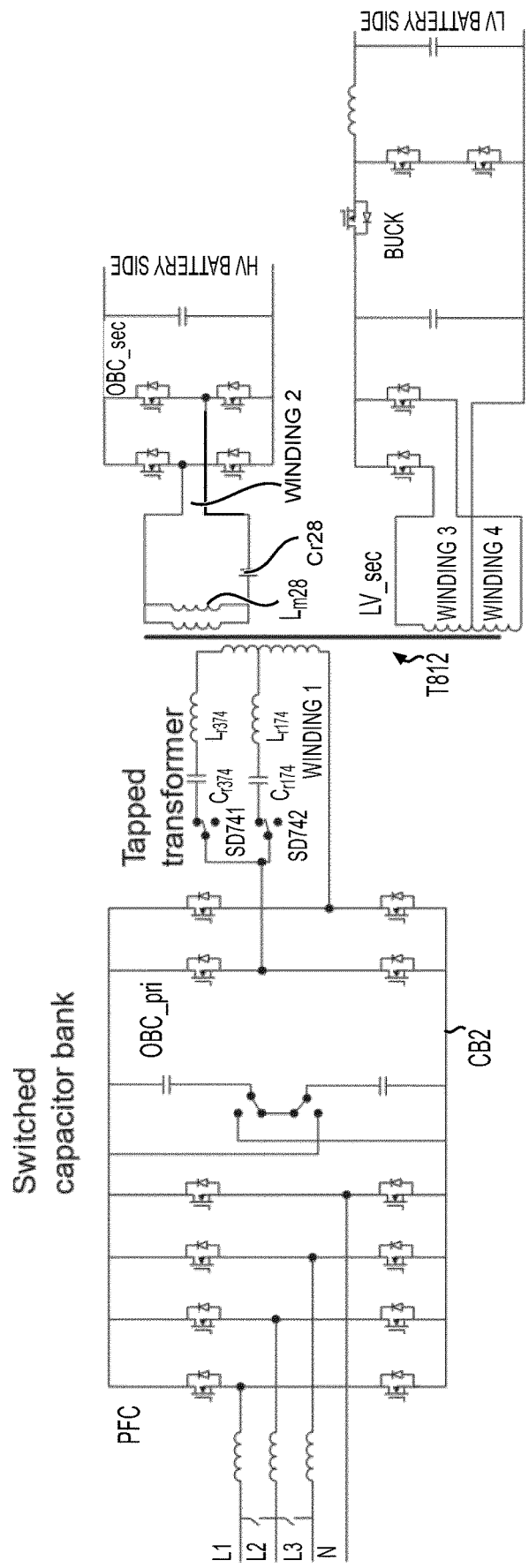
Figure 8L:
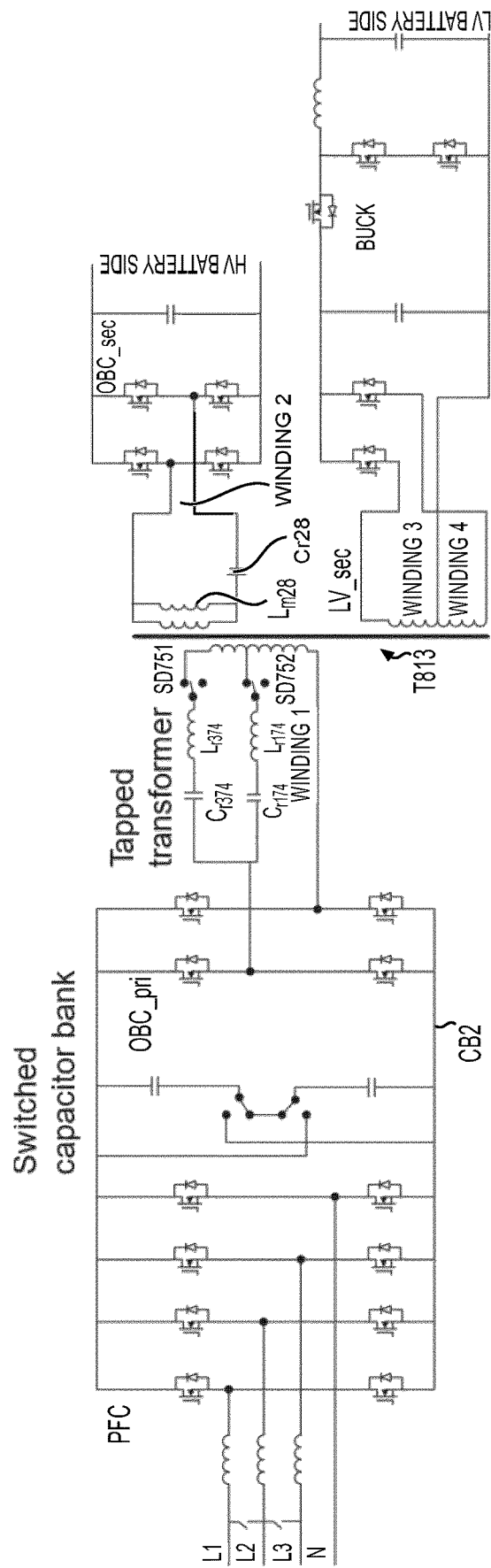

Many aspects of FIGS. 7K & 8L are similar to FIG. 7E and are incorporated. However, tapped transformer T712 differs by comprising a tapped primary winding Winding 1 and a tapped secondary winding at Windings 3 & 4. And, resonant transformer T813 differs by comprising an intrinsic secondary resonant inductance such that the secondary winding of the HV resonant circuit comprises a resonant capacitor Cr28 and magnetizing inductor Lm28 but the resonant circuit does not comprise an extrinsic resonant inductor to couple voltage to the HC battery side.

Figure 7L:
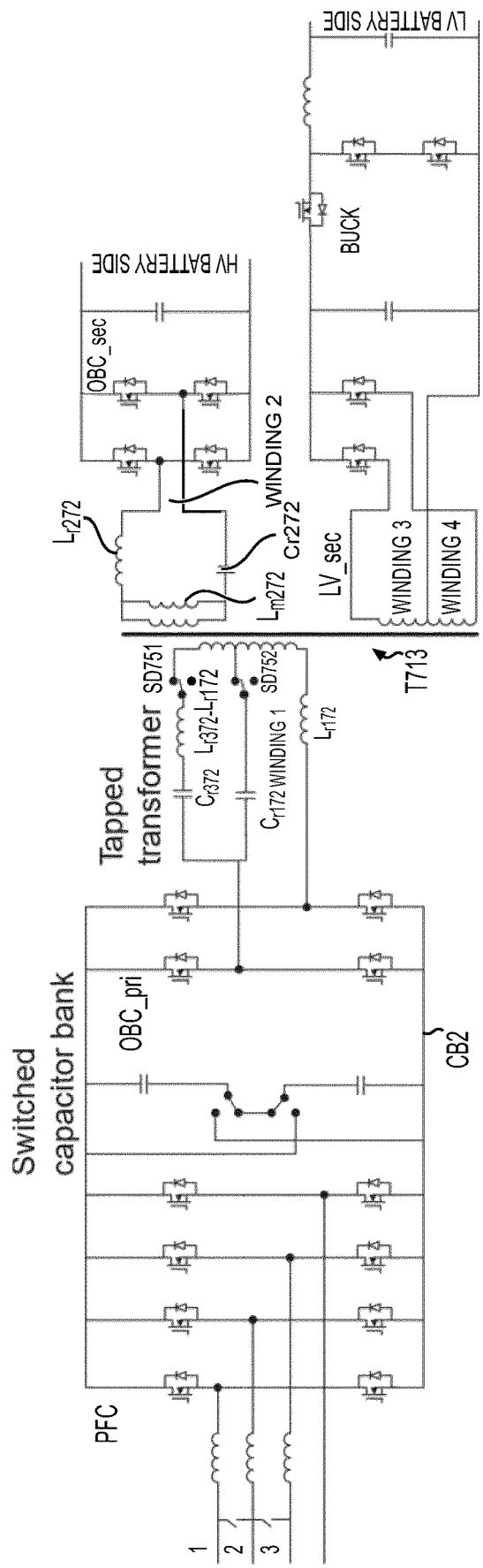
Figure 8M:
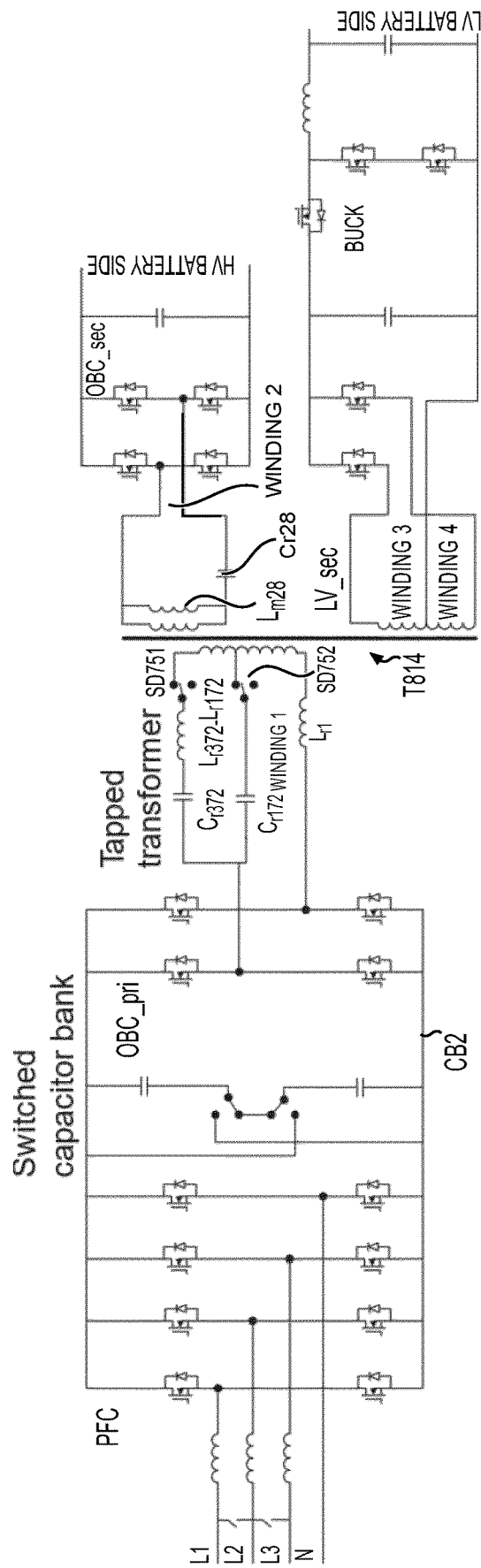

Many aspects of FIG. 7F are repeated in FIGS. 7L & 8M and are incorporated. However, tapped transformer T713 differs by comprising a tapped primary winding Winding 1 and a tapped secondary winding at Windings 3 & 4. And, resonant transformer T814 differs by comprising an intrinsic secondary resonant inductance such that the secondary winding of the HV resonant circuit comprises a resonant capacitor Cr28 and magnetizing inductor Lm28 but the resonant circuit does not comprise an extrinsic resonant inductor to couple voltage to the HC battery side.

Figure 7M:
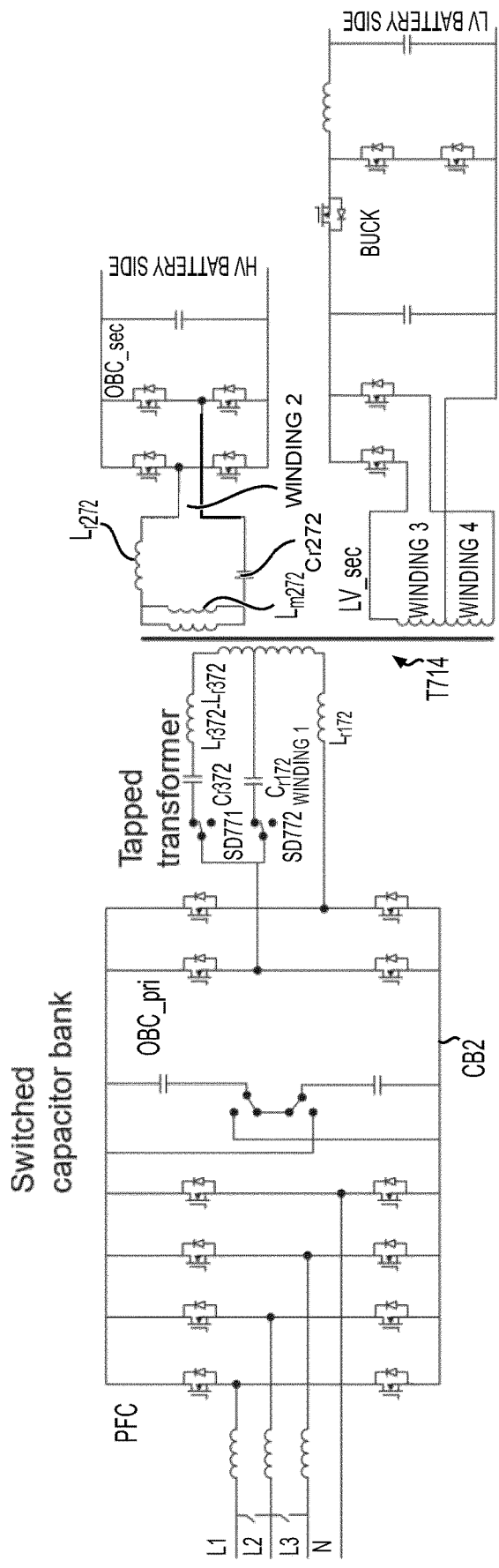
Figure 8N:
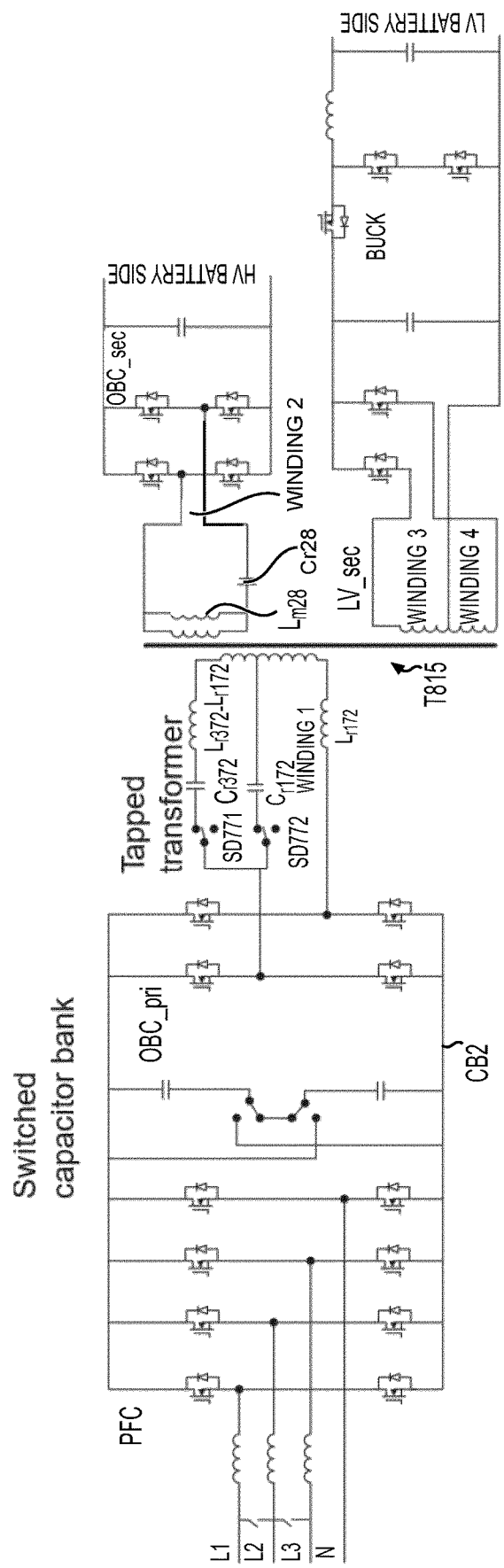
Figure 80:
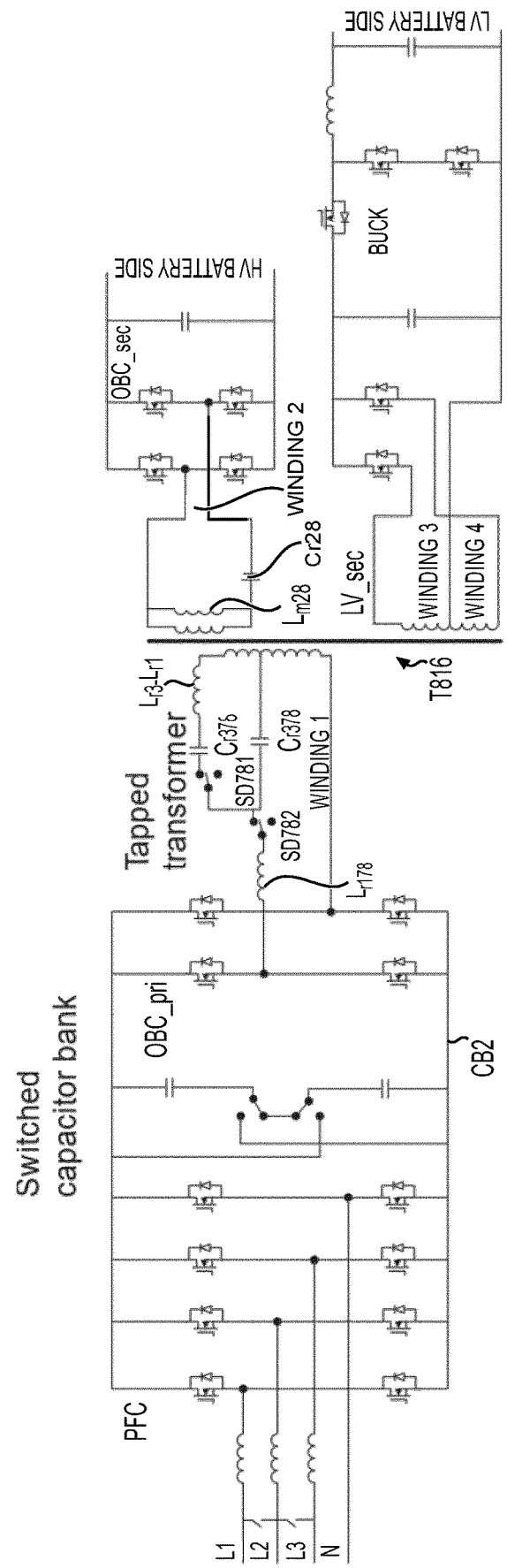

Many aspects of FIG. 7G are repeated in FIGS. 7M & 8N and are incorporated. However, tapped transformer T714 differs by comprising a tapped primary winding Winding 1 and a tapped secondary winding at Windings 3 & 4. And, resonant transformer T815 differs by comprising an intrinsic secondary resonant inductance such that the secondary winding of the HV resonant circuit comprises a resonant capacitor Cr28 and magnetizing inductor Lm28 but the resonant circuit does not comprise an extrinsic resonant inductor to couple voltage to the HC battery side.

Figure 7N:
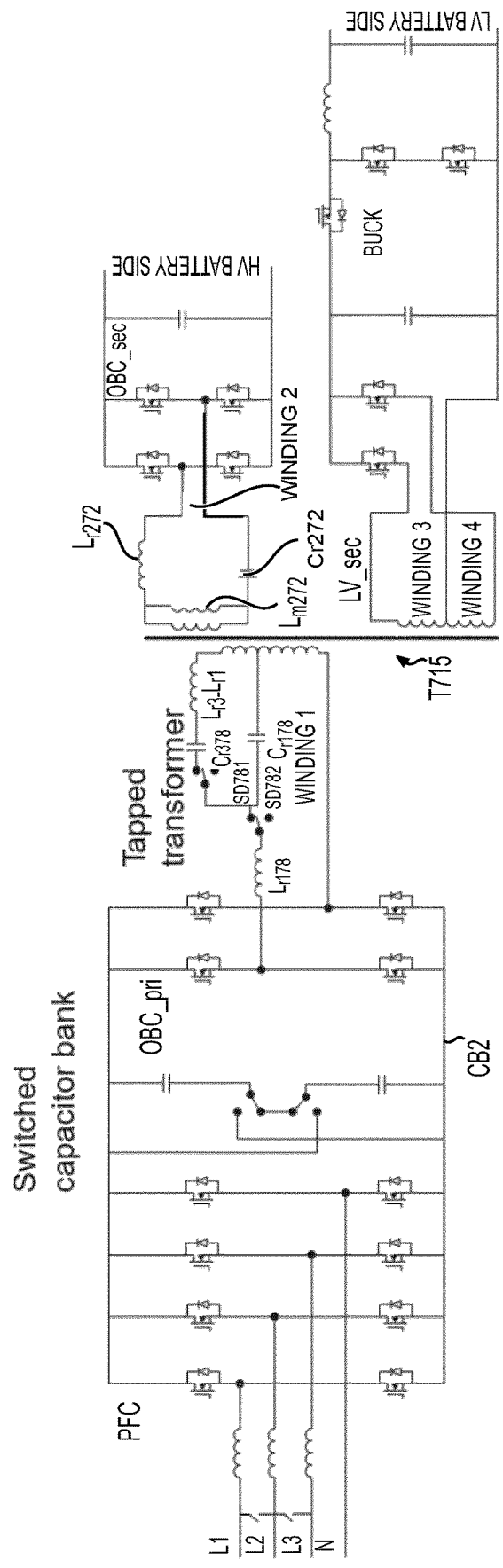
Figure 70:
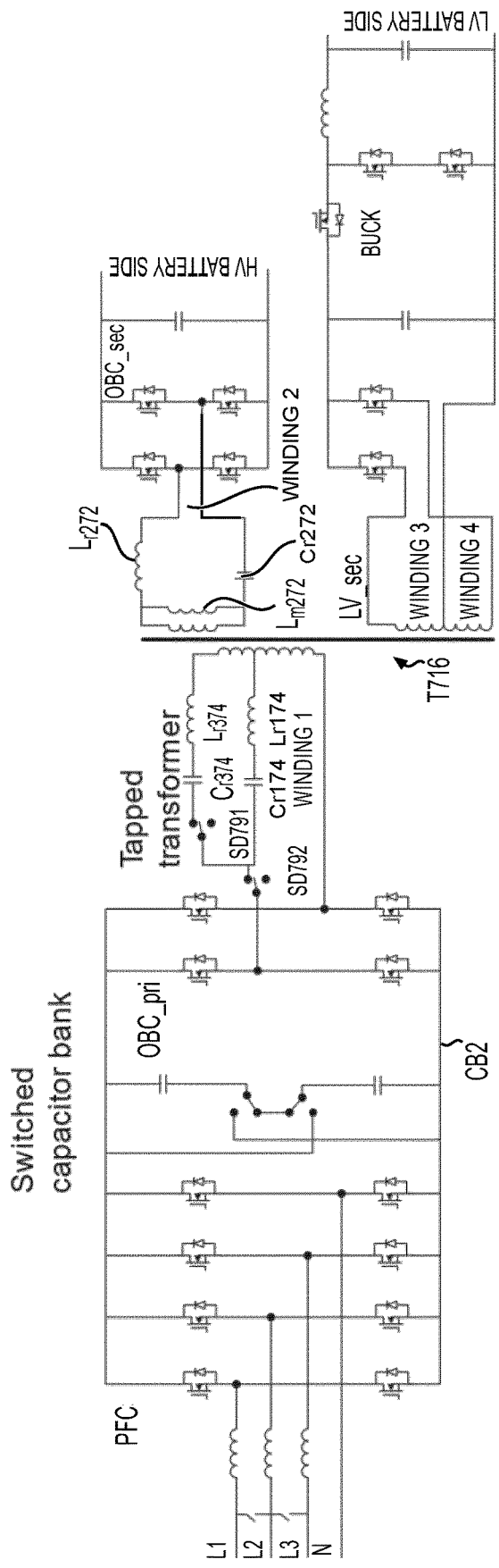
Figure 8P:
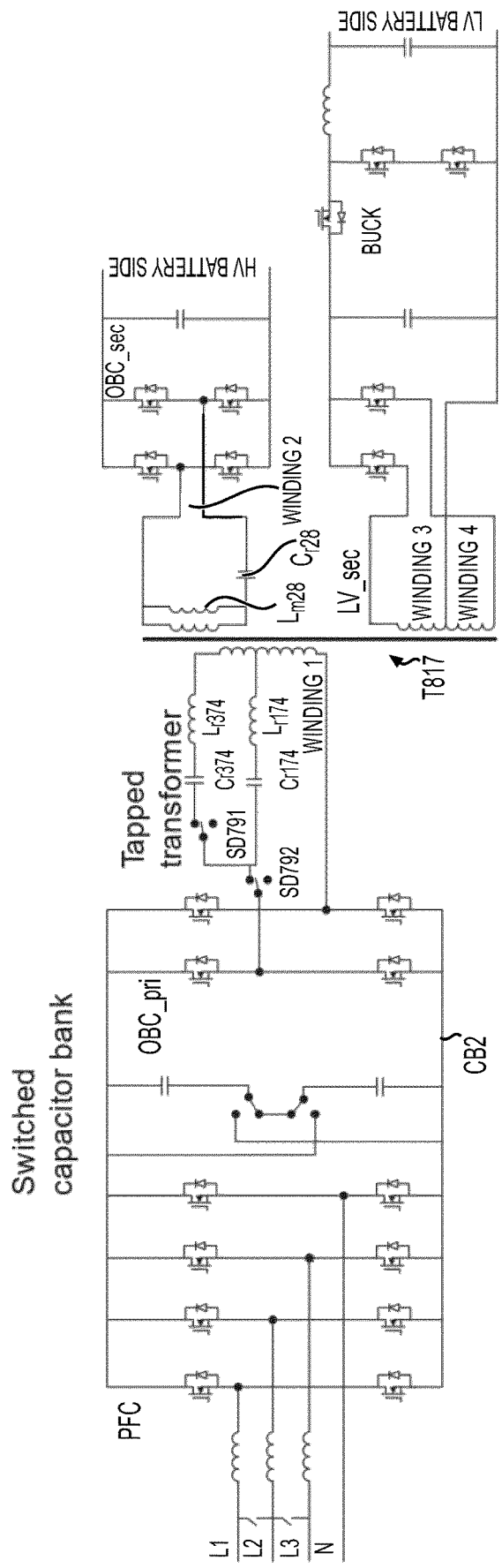

Many aspects of FIG. 7H are repeated in FIGS. 7N & 8O and are incorporated. However, tapped transformer T715 differs by comprising a tapped primary winding Winding 1 and a tapped secondary winding at Windings 3 & 4. And, resonant transformer T816 differs by comprising an intrinsic secondary resonant inductance such that the secondary winding of the HV resonant circuit comprises a resonant capacitor Cr28 and magnetizing inductor Lm28 but the resonant circuit does not comprise an extrinsic resonant inductor to couple voltage to the HC battery side Many aspects of FIG. 7I are repeated in FIGS. 7O & 8P and are incorporated. However, tapped transformer T716 differs by comprising a tapped primary winding Winding 1 and a tapped secondary winding at Windings 3 & 4. And, resonant transformer T817 differs by comprising an intrinsic secondary resonant inductance such that the secondary winding of the HV resonant circuit comprises a resonant capacitor Cr28 and magnetizing inductor Lm28 but the resonant circuit does not comprise an extrinsic resonant inductor to couple voltage to the HC battery side As mentioned above, when there is a mismatch between the primary windings and the secondary windings, a leakage inductance can occur. This can occur when the windings are imbalanced due to manufacturing tolerance or can be more purposefully built into the circuit, as when the number of turns are designed to differ. With the mismatch, the transformer resonates with an internal resonant inductance such that an extrinsic (hardwire) resonant inductor can be omitted. FIGS. 8A-8P memorialize and enable this use of intrinsic resonant inductance. What remains in Winding 2 of the secondary winding are the magnetizing inductor Lm28 and resonant capacitor Cr28.

There is a correspondence among figures whereby aspects of FIG. 7A can be incorporated into the resonant transformers T81 & T82, with differences in the HV secondary winding being noted as above and with the presence of an untapped LV secondary winding in FIG. 8A as compare to the tapped secondary winding of resonant transformers T71 & T82.

In FIG. 9, an embodiment comprising a tapped secondary winding on the HV battery side in Winding 2 is shown in combination with a tapped primary winding in Winding 1 and another secondary winding in Winding 3 on the LV battery side. With this design, the switched capacitor bank CB2 and bank capacitors BC2, BC3 can be configured to couple to the primary side winding or disconnect by action of switching device SD71. The primary side winding and CLLLC resonant circuit is incorporated from FIG. 8A. But, a secondary side tapped winding is formed on HV battery side in Winding 2. Now, an upper circuit leg on the secondary side comprises a resonant inductor Lr491 and resonant capacitor Cr491 between the upper tapped secondary winding and the switching device SD91. A middle circuit leg on the secondary side connects to the tap of the secondary side tapped winding. The middle circuit leg comprises another resonant circuit comprising resonant inductor Lr291 and resonant capacitor Cr291, which resonant circuit is selectable by the switching device SD91. The switching device SD91 can connect to the upper circuit leg, the middle circuit leg, or can be disconnected from the secondary winding Winding 2. Now, there is even more flexibility in the selection and control of gain, resonant impedance, and resonant frequency. And, there is further control in the maintenance of the magnetizing inductance to leakage inductance ratio as voltage is transferred across resonant transformer T91. The design of FIG. 9 can be used so that the multi-tap windings can be used instead of full-bridge (FB1, FB2) or half-bridge arrangements.

Figure 10:
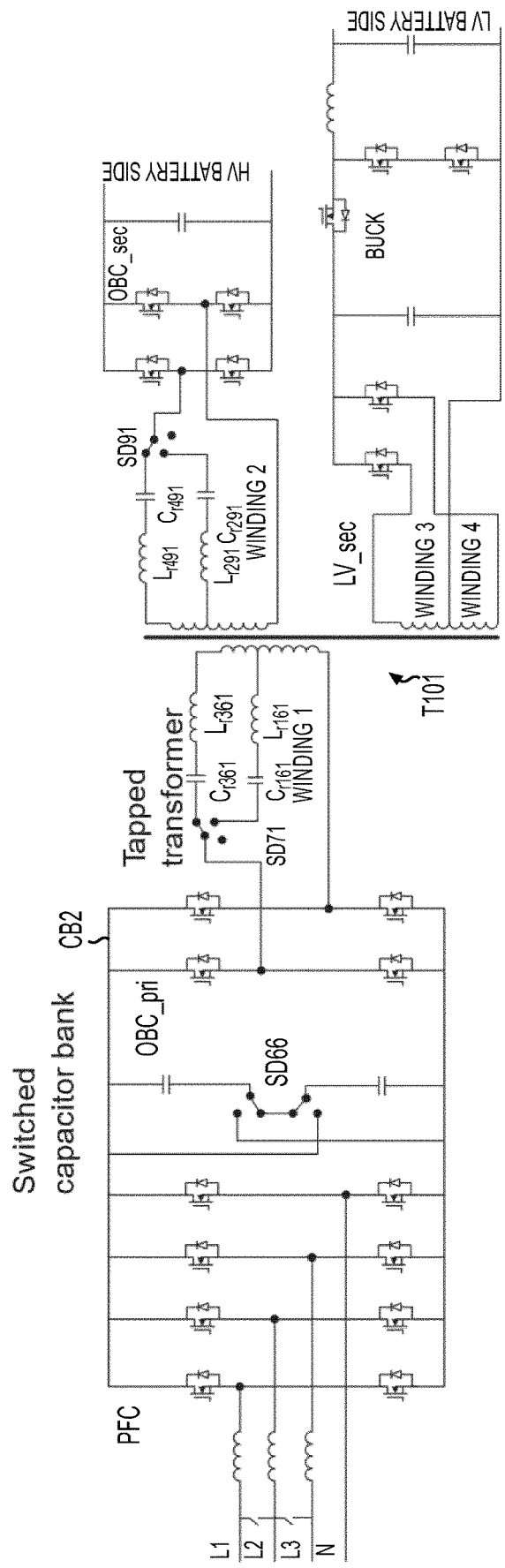
FIG. 10 shows a tapped resonant transformer DC/DC converter device.
Figure 11A:
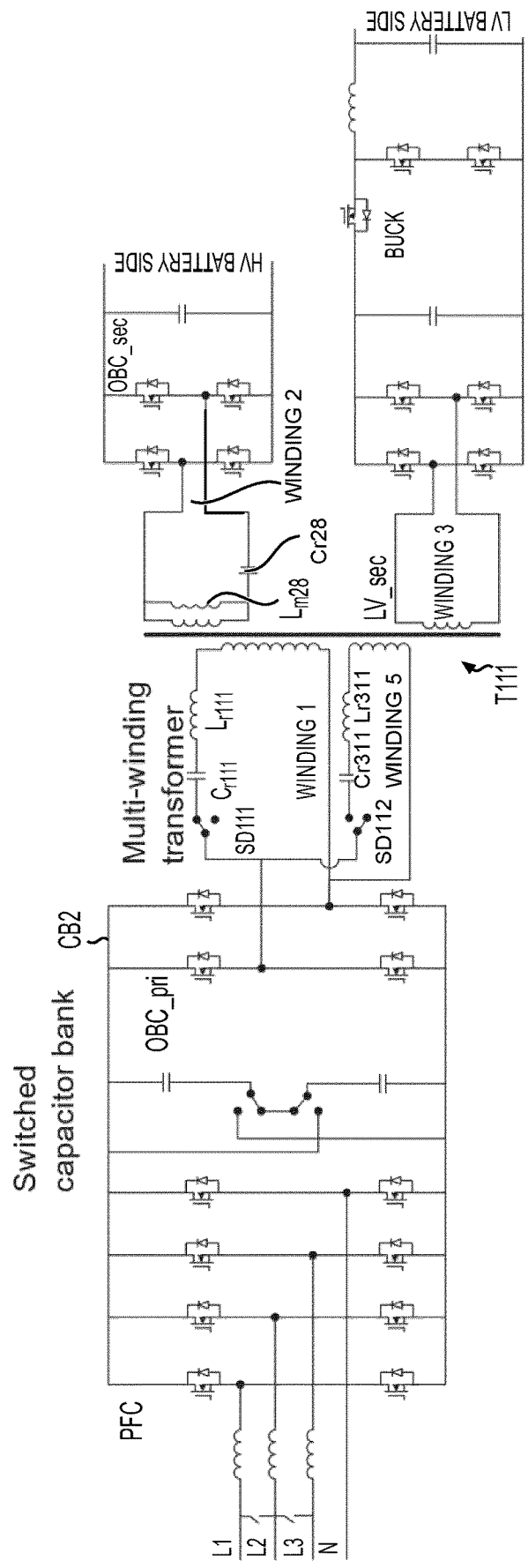
FIGS. 11A-11H show additional alternative switchable primary winding DC/DC converter devices.
Figure 11B:
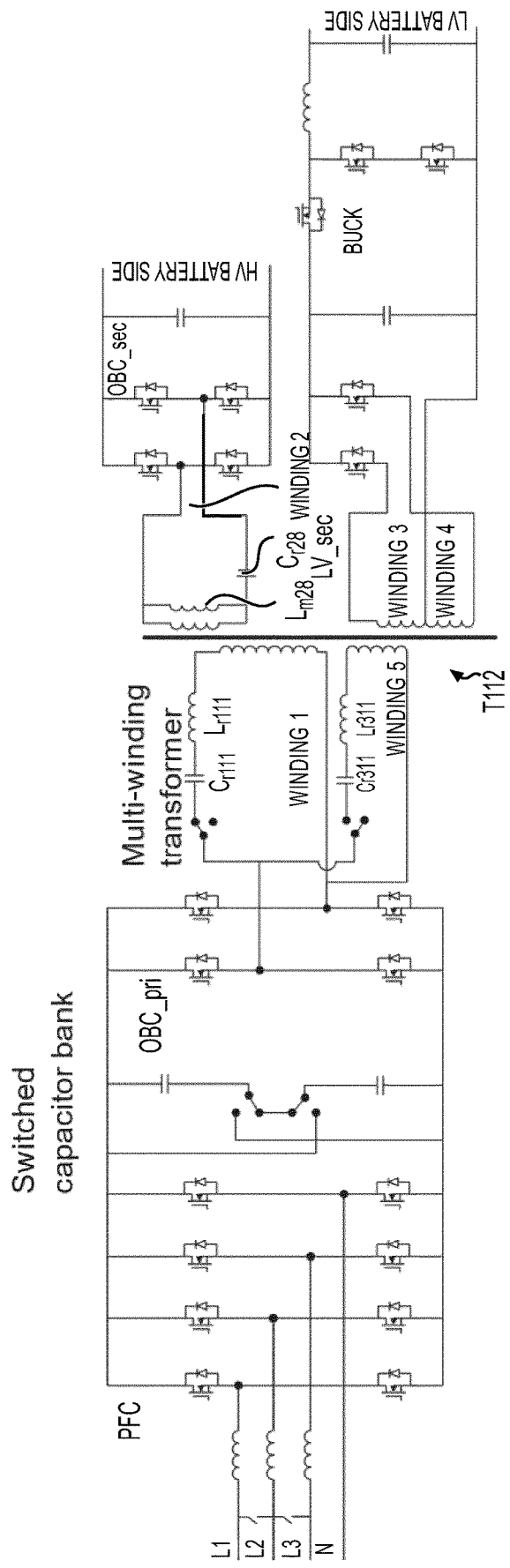
Figure 11C:
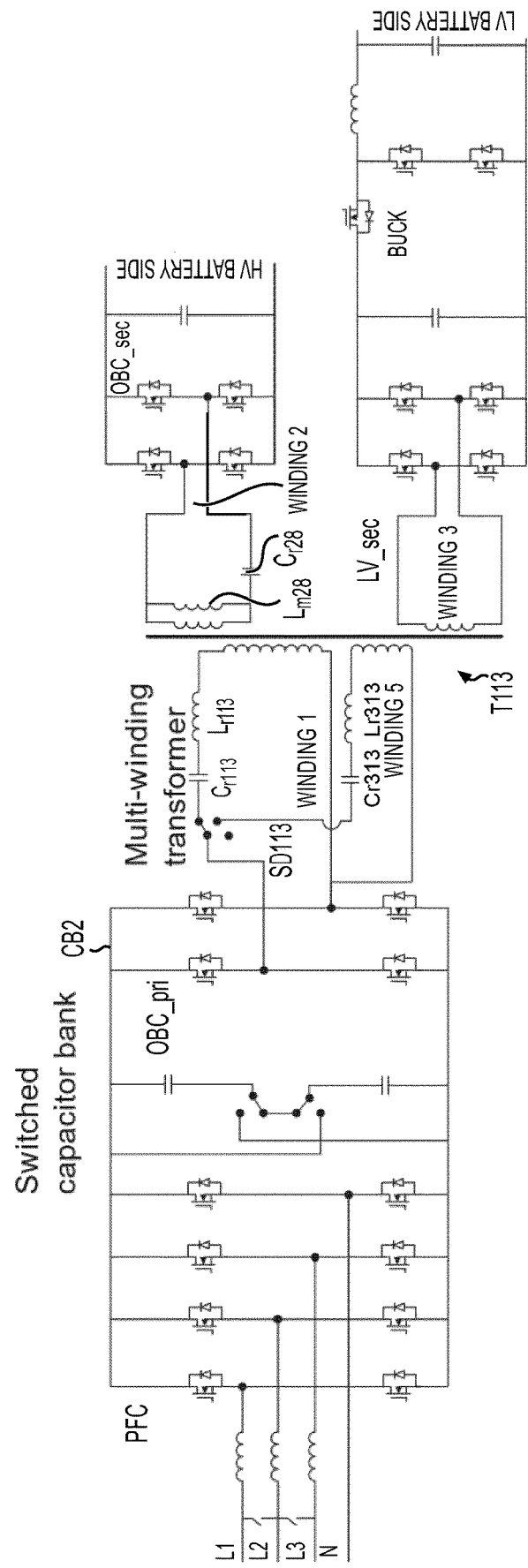
Figure 11D:
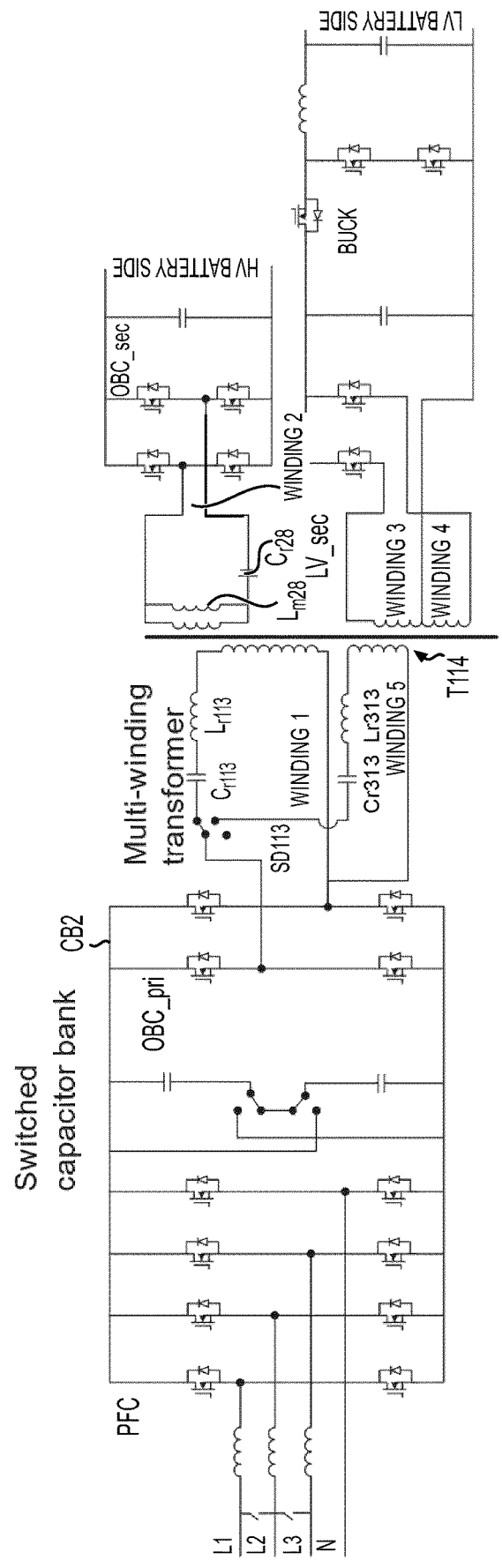
Figure 11E:
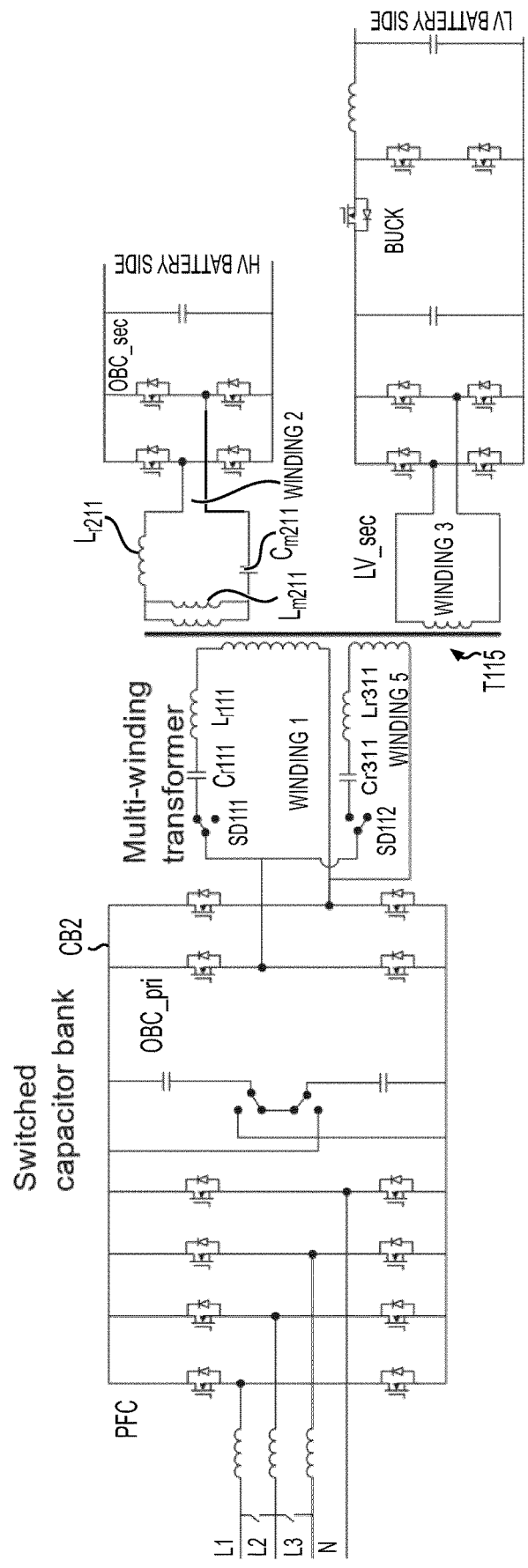
Figure 11F:
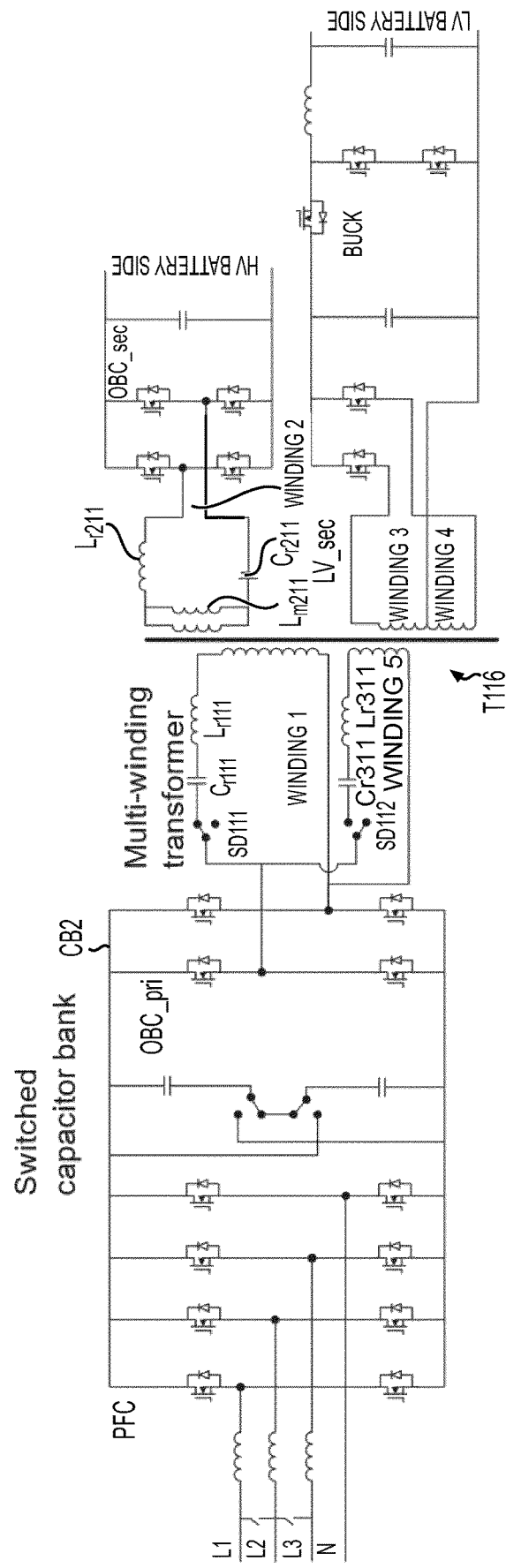
Figure 11G:
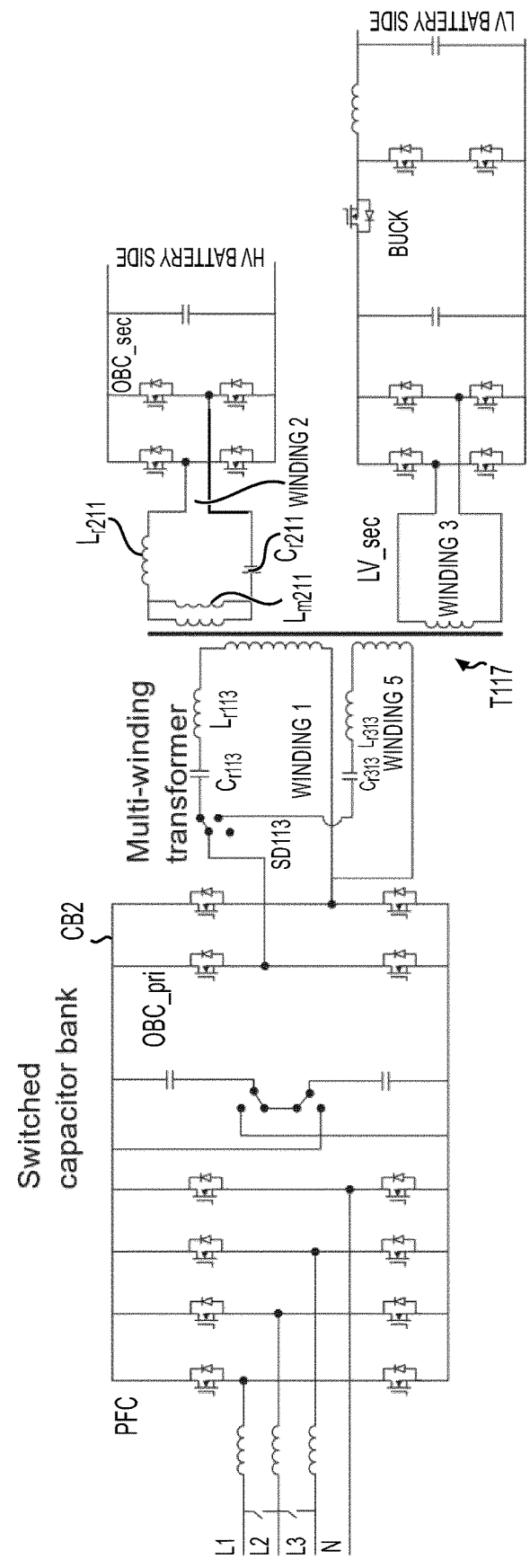
Figure 11H:
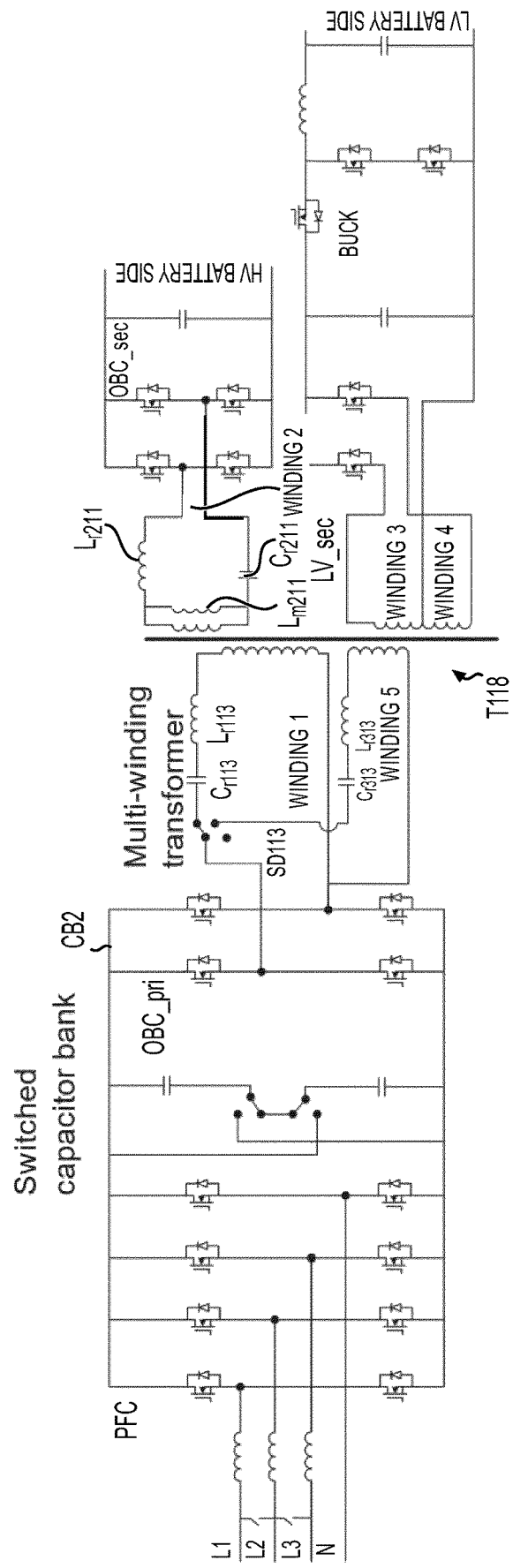

FIG. 10 shows tapped primary windings combined with two tapped secondary windings. This incorporates and expands upon the teachings of FIG. 9 such that the secondary windings at Windings 3 & 4 are also tapped. There is immense variability and control of the turns ratios of the primary and secondary windings of the resonant transformer T101.

FIGS. 11A-11H incorporate the selectable primary winding comprising a plurality of switchable primary windings. The plurality of switchable primary windings are configured as "either/or" circuits, where one or the other are used during a voltage transfer. The HV Battery Side secondary windings are as above, either lacking an extrinsic resonant inductor because the windings, by their imbalance, will intrinsically provide an inductive resonance across the transformers T111-T114. So, only magnetizing inductor Lm28 and resonant capacitor Cr28 are shown on the HV secondary winding resonant circuit. Or, the HV Battery side secondary windings comprise an extrinsic resonant inductor Lr211 and a magnetizing inductor Lm211 and a resonant capacitor Cr211 with functionality of voltage transfer across resonant transformer T115-T118 similar to above embodiments. The low voltage battery side can vary between a switchable secondary winding Winding 3 (FIGS. 11A, 11C, 11E, 11G) and tapped secondary winding Windings 3 & 4 (FIGS. 11B, 11D, 11F, 11H).

In FIGS. 11A, 11B, 11E, & 11F, on the primary winding side of resonant transformer T111, T112, T115, T116, alternative, selectable resonant circuits are formed. A first resonant circuit on the primary side is formed with switching device SD111 connectable to or disconnectable from the upper circuit leg. The upper circuit leg of primary winding Winding 1 comprises a resonant capacitor Cr111 and resonant inductor Lr111. A number of turns form the primary windings of Winding 1, and a bottom circuit leg of Winding 1 connects back to the switched capacitor bank CB2. The turns ratio of Winding 1 can be selected or deselected by control of switching device SD111. But, a second switchable primary winding Winding 5 is formed by connecting switching device SD112 so that it can connect and disconnect from an upper circuit leg comprising a resonant capacitor Cr311 and a resonant inductor Lr311. Primary windings of Winding 5 can have a different number of turns than Winding 1. The resonant converter device is arranged with the resonant capacitors Cr111 & Cr311 and resonant inductors Lr111 & Lr311 between their respective switching devices SD111 & SD112 and their respective primary windings.

Turning to FIGS. 11C, 11D, 11G, & 11H, multi-winding transformers in the form of resonant transformers T113 & T114 are formed. On the primary winding side of resonant transformer T113, 114, alternative resonant circuits are formed with alternative switchable primary windings. A first resonant circuit on the primary side is formed with 3-position switching device SD113 to connect to or to disconnect from the upper circuit leg. The upper circuit leg of primary winding Winding 1 comprises a resonant capacitor Cr113 and resonant inductor Lr113. A number of turns form the primary windings of Winding 1, and a bottom circuit leg of Winding 1 connects back to the switched capacitor bank CB2. The turns ratio of Winding 1 can be selected or deselected by control of switching device SD113. But, a second position of switching device SD113 selects or deselects a second switchable primary winding Winding 5. Second resonant circuit on the primary winding side is formed by connecting switching device SD113 so that it can connect and disconnect from an upper circuit leg comprising a resonant capacitor Cr313 and a resonant inductor Lr313. Primary windings of Winding 5 can have a different number of turns than Winding 1. The resonant converter device is arranged with the resonant capacitors Cr113 & Cr313 and resonant inductors Lr113 & Lr313 between the switching device SD113 and the respective switchable primary windings.

Additional alternatives can be mentioned. On the left hand side of many of the figures, an inductor array is shown on the lines L1, L2, L3. Such an inductor array can be configured as tapped or split. Inductor variations can be included on the left side of the switched capacitor bank. Such a variation can comprise splitting the inductors into L1$a$ & L2$a$, L1$b$ & L2$b$, and L1$c$ & L2$c$. In some variations disclosed herein, it is possible to couple L1$a$, L1$b$ and L1$c$ together and L2$a$, L2$b$ and L2$c$ together. What can also be done is to couple L1$a$ and L2$a$, L1$b$ and L2$b$, L1$c$ and L2$c$. It is possible to keep the cores uncoupled as an orthogonal solution in which flux from L1$a$ will not interact with L2$a$, and so forth. In another variation, the L1$a$ core is equal to the L2$a$ core, the L1$b$ core is equal to the L2$b$ core, and the L1$c$ core is equal to the L2$c$ core. Core a can equal core b or core c, or each of cores a, b, c can differ.

As another variation, it is possible to take advantage of the high coupling efficiency modifying the buck inductors with an alternative core arrangement. This can be done at an inductor of the LV battery side, for example an inductor between the buck and the LV battery side coupling capacitor. A multi-winding solution, such as an E-core, I-core, PQ-core or other coupled inductor can be used.

In the DC-to-DC buck converter, the buck inductors are integrated together with very low mutual coupling (coupling coefficient<0.1) between these two buck inductors, so that the power flow in the interleaved two buck converters will not affect each other. This very low mutual coupling can be achieved by way of the transformer arrangement shown herein. That is, by keeping the gain low, and by achieving the switchable resonant impedance of the resonant device when a voltage inputted to the resonant device varies, additional improvements can be installed in the circuit. Such improvement can comprise the low coupling coefficient coupled inductor.

In the integrated buck inductors, two PQ cores and one I core are used. Both inductor windings generate magnetic field in the same direction: this magnetic field is a DC magnetic field generated by DC current plus an AC field generated by the high frequency current ripple. The I core provides a magnetic flux return path for the magnetic field to ensure that the mutual coupling/coupling coefficient between these two buck inductors are very low. The DC magnetic fields are cancelled in the I core, the thickness of the I core is enough to support the AC magnetic field without saturation.

In another alternative, a set of inductors is used in the LV Battery side. When we have a coupled inductor, then the magnetizing inductance will be cancelled because the flux generated by two windings will cancel each other, and we will only have the leakage inductance. The DC flux will be cancelled, but the AC flux is still there, which should not affect the inductance value.

The coupled inductor size can be smaller because the flux generated by two windings will cancel each other in the core, that means the core cross-section area can be smaller. Compared with separate inductors, the close-coupled inductor and the loosely-coupled inductor are smaller than conventional inductors.

As disclosed herein, an integrated on-board charger and DC/DC converter can be formed with capacitor and magnetics reductions. An integrated topology for on board charger and DC/DC converter is presented. The proposed topology uses switched capacitor banks and tapped winding transformers and or switchable windings to yield the following features:

1. Bidirectional power flow
2. Ultra wide AC voltage input capability
3. Compact magnetics, due to magnetic integration
4. Reduced DC link capacitors When using a tapped winding 3 port transformer, different voltage conversion ratios for single phase and three phase operations can be enabled, allowing for efficient operation of the on-board charger with a wide range of AC input voltages.

When using the switched capacitor bank, lower voltage capacitors than required by the maximum operating voltage in the phase case can be used. The capacitor banks can be connected in parallel to support higher ripple current requirement (single phase operation) or in series to support higher blocking voltage requirement (three phase operation).

In some implementations, it is beneficial to configure the selectable primary windings and secondary windings to differ in number of turns or number of windings. Then, inductors, including resonant inductors, associated with the primary and secondary windings can have different values. Via switching devices, it is then possible to connect the inductors so that a common inductor acts on the primary or secondary windings while another inductor is added on.

It is possible to adjust voltage gain across the resonant transformer by including switching frequency variations.

When including the switching devices in the resonant circuit device, the switch motion can represent the ability to adjust the resonant impedance of the voltage transfer.

While tapped transformers are shown with a single tap, duplication of parts permits the inclusion of additional taps on a winding and the addition of resonant circuits to the duplicated taps and duplicated circuit legs. The resonant circuits can also be called a resonating impedance circuit when included as part of the resonant converter. The resonating impedance being a control point for the voltage transfer across the resonating transformer (which is sometimes called a tapped transformer).

By selecting the resonant circuits, comprised of the transformer windings, resonant capacitor, and resonant inductor, the gain for the voltage range can be selected. Even in the less efficient embodiments, splitting a gain range of 0.8-8 into two ranges, such as 0.8-4 and 4-8 is more efficient than trying to operate voltage transfer for the whole range.

Other implementations will be apparent to those skilled in the art from consideration of the specification and practice of the examples disclosed herein.

What is claimed is:

1. A resonant converter device for varying resonant impedance, comprising:
    a selectable primary winding comprising a plurality of circuit legs, the selectable primary winding comprising one or more of a tapped primary winding or a plurality of switchable primary windings;
    at least one secondary winding coupled to the selectable primary winding to form a resonant transformer, the at least one secondary winding comprising at least a second circuit leg;
    at least one resonant inductor coupled to at least one of the plurality of circuit legs or coupled to the second circuit leg;
    a plurality of resonant capacitors, each circuit leg of the plurality of circuit legs comprising at least a respective one of the plurality of resonant capacitors coupled within the each circuit leg, and at least a second resonant capacitor of the plurality of resonant capacitors coupled within the second circuit leg; and
    one or more switching devices connected to the resonant transformer and configured to selectively vary a resonant impedance of the resonant converter device when a voltage inputted to the resonant converter device varies.

2. The resonant converter device of claim 1, wherein the selectable primary winding comprises a first number of turns, wherein the at least one secondary winding comprises a second number of turns, and wherein the first number of turns differs from the second number of turns so as to induce a resonant inductance in the resonant transformer.

3. The resonant converter device of claim 1, wherein the at least one resonant inductor is configured to receive variable inductances, and wherein, when the one or more switching devices switch to connect to the resonant transformer, a predetermined magnetizing inductance to leakage inductance ratio is maintained.

4. The resonant converter device of claim 1, wherein the plurality of resonant capacitors are configured to receive one of a single phase current or a three phase current, and wherein the one or more switching devices are configured to selectively connect to the resonant transformer to maintain a predetermined resonant frequency.

5. The resonant converter device of claim 1, wherein the selectable primary winding comprises the plurality of switchable primary windings, and wherein the plurality of switchable primary windings are configured with at least one of the one or more switching devices to connect serially or alternatively to form the resonant transformer.

6. The resonant converter device of claim 1, wherein the selectable primary winding comprises the at least one tapped primary winding comprising a plurality of windings divided by at least a first tap, and wherein a first number of windings on a first side of the first tap is not equal to a second number of windings on a second side of the first tap.

7. The resonant converter device of claim 1, wherein the at least one secondary winding comprises a tapped secondary winding.

8. The resonant converter device of claim 1, wherein the at least one secondary winding comprises a plurality of switchable secondary windings, and wherein the plurality of switchable secondary windings are configured with at least one of the one or more switching devices to connect serially or alternatively to form the resonant transformer.

9. The resonant converter device of claim 1, wherein the one or more switching devices are configured to selectively connect the selectable primary winding to operate the resonant transformer near a resonant frequency of the resonant converter device.

10. The resonant converter device of claim 1, wherein the switching devices are connected to operate the resonant converter to switch among the plurality of resonant capacitors to maintain the resonant converter at or near unity gain when the voltage inputted to the resonant converter device varies.

11. The resonant converter device of claim 1, wherein the one or more switching devices are configured to selectively switch among the plurality of circuit legs to vary the resonant impedance of the resonant converter device to maintain a predetermined resonant frequency when a voltage inputted to the resonant converter device varies.

12. The resonant converter device of claim 1, wherein the plurality of switching devices comprise one or both of one or more relays and a plurality of metal-oxide-semiconductor field-effect transistors ("MOSFETs").

13. The resonant converter device of claim 1, further comprising a capacitor bank comprising at least one bank capacitor, one or both of a single phase input and a three phase input, and bank switches configured to couple the one or both single phase input and three phase input to the plurality of switching devices through the at least one bank capacitor.

14. The resonant converter device of claim 13, further comprising a bank relay coupled to the at least one bank capacitor, and wherein the at least one bank capacitor comprises a high side capacitor on a first side of the bank relay and a low side capacitor on a second side of the bank relay.

15. The resonant converter device of claim 13, further configured as an on board charger and comprising a first battery circuit and a second battery circuit coupled to the resonant transformer, wherein the first battery circuit operates at a higher voltage than the second battery circuit.

16. An on board charger comprising the resonant converter device of claim 1, comprising a first battery circuit and a second battery circuit coupled to the resonant transformer, wherein the first battery circuit operates at a higher voltage than the second battery circuit.

17. The resonant converter device of claim 1, comprising a tapped or split inductor array connected on a side of the resonant transformer comprising the selectable primary winding.

* * * * *